United States Patent
Takahashi et al.

(10) Patent No.: US 8,983,748 B2
(45) Date of Patent: Mar. 17, 2015

(54) VEHICLE DYNAMICS CONTROL DEVICE

(71) Applicant: Hitachi, Ltd., Chiyoda-ku, Tokyo (JP)

(72) Inventors: Junya Takahashi, Hitachinaka (JP); Makoto Yamakado, Tsuchiura (JP); Atsushi Yokoyama, Tokyo (JP); Shinjiro Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/217,590

(22) Filed: Mar. 18, 2014

(65) Prior Publication Data

US 2014/0200787 A1    Jul. 17, 2014

Related U.S. Application Data

(63) Continuation of application No. 12/709,040, filed on Feb. 19, 2010, now abandoned.

(30) Foreign Application Priority Data

Mar. 30, 2009  (JP) ................................. 2009-080852

(51) Int. Cl.
*G06F 7/70*   (2006.01)
*B60W 30/00*  (2006.01)
(Continued)

(52) U.S. Cl.
CPC .............. *B60W 30/00* (2013.01); *B60T 8/1755* (2013.01); *B60W 30/045* (2013.01); *B60W 10/04* (2013.01); *B60W 10/18* (2013.01); *B60T 2270/613* (2013.01)
USPC .......................................................... 701/70

(58) Field of Classification Search
CPC ........... B60T 8/1755; B60T 2270/613; B60W 30/045
USPC ....................................................... 701/70–98
See application file for complete search history.

(56) References Cited

U.S. PATENT DOCUMENTS

| 5,198,982 A | 3/1993 | Kobayashi |
| 6,017,101 A | 1/2000 | Matsuda |

(Continued)

FOREIGN PATENT DOCUMENTS

| EP | 2 003 035 A2 | 12/2008 |
| EP | 2 147 842 A1 | 1/2010 |

(Continued)

OTHER PUBLICATIONS

European Search Report dated May 11, 2010 (Seven (7) pages).

*Primary Examiner* — John Q Nguyen
*Assistant Examiner* — Jordan S Fei
(74) *Attorney, Agent, or Firm* — Crowell & Moring LLP

(57) ABSTRACT

A vehicle dynamics control device includes a control unit that executes braking/driving torque control based upon vehicle information that includes operation input information and vehicle dynamics information. The operation input information includes a lateral motion operation index pertaining to a lateral motion operation executed to generate a lateral motion in the vehicle; the vehicle dynamics information includes a longitudinal acceleration generated in the vehicle and a lateral motion index indicating a lateral motion occurring in the vehicle; and the control unit determines a handling assurance acceleration limit with a maximum longitudinal acceleration value that assumes a substantially linear proportional relationship with the lateral motion operation index and the lateral motion index over a range in which the lateral motion operation index assumes a value equal to or less than a predetermined value or the lateral motion index assumes a value equal to or less than a predetermined value.

3 Claims, 21 Drawing Sheets

(51) Int. Cl.
*B60T 8/1755* (2006.01)
*B60W 30/045* (2012.01)
*B60W 10/04* (2006.01)
*B60W 10/18* (2012.01)

(56) References Cited

U.S. PATENT DOCUMENTS

| | | | |
|---|---|---|---|
| 2004/0094342 A1 | 5/2004 | Kowatari et al. | |
| 2005/0004738 A1 | 1/2005 | Gronau et al. | |
| 2009/0184572 A1 | 7/2009 | Yamada et al. | |
| 2010/0114449 A1* | 5/2010 | Shiozawa et al. | 701/90 |
| 2010/0174437 A1* | 7/2010 | Benedict et al. | 701/29 |
| 2011/0264349 A1 | 10/2011 | Okubo et al. | |

FOREIGN PATENT DOCUMENTS

| | | |
|---|---|---|
| JP | 06-001229 | 1/1994 |
| JP | 06-036187 | 2/1994 |
| JP | 10-269499 | 10/1998 |
| JP | 2007 216839 | 8/2007 |
| JP | 2008-285066 | 11/2008 |
| JP | 2009-120116 | 6/2009 |
| WO | WO 2008/133150 A1 | 11/2008 |

* cited by examiner

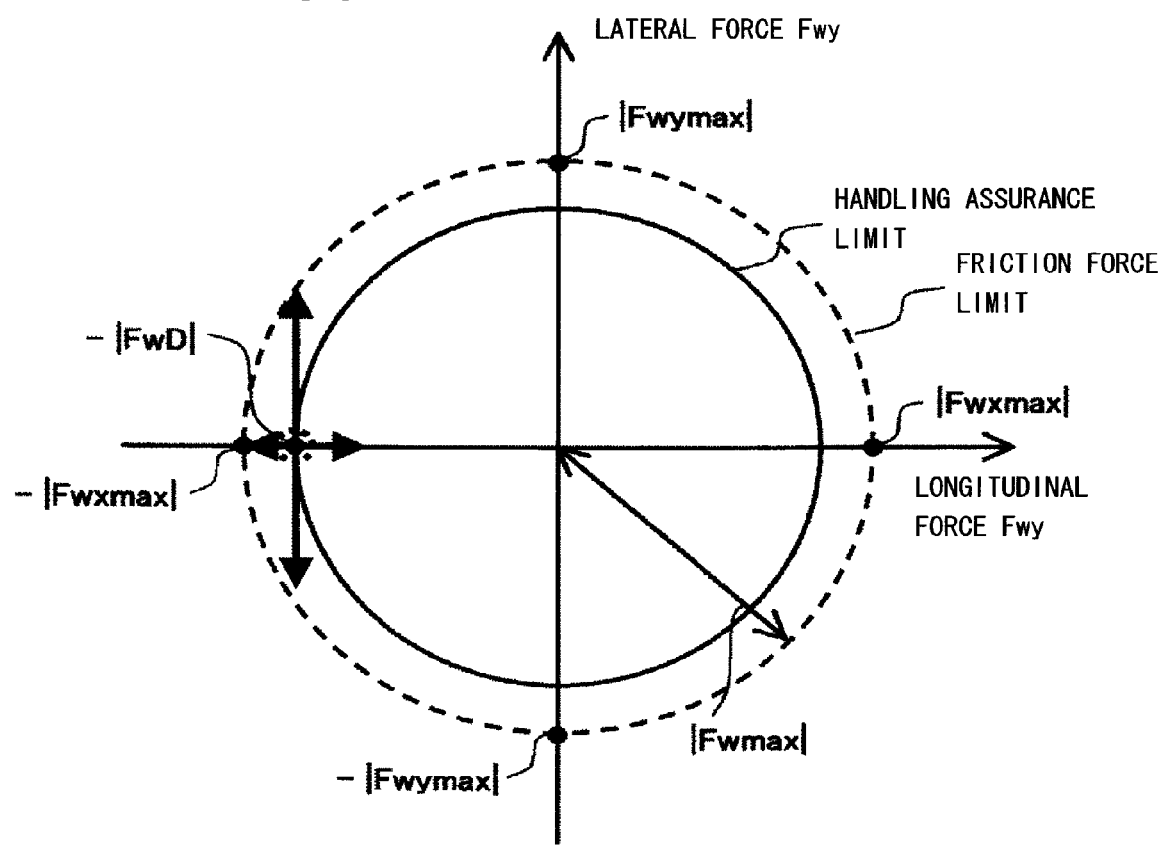

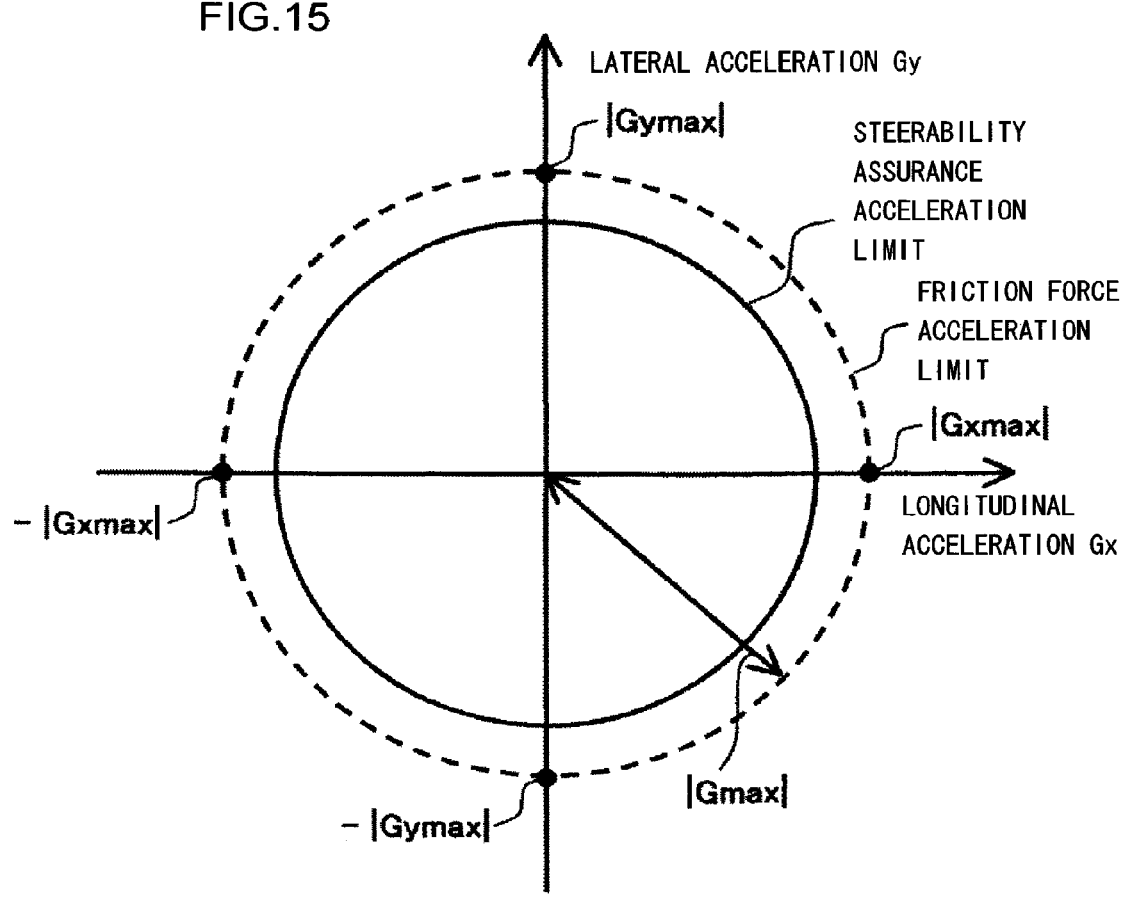

VEHICLE DYNAMICS CONTROL DEVICE

CROSS REFERENCE TO RELATED APPLICATIONS

This application is a continuation of U.S. application Ser. No. 12/709,040, filed Feb. 19, 2010, which claims priority from Japanese Patent Application No. 2009-080852, filed Mar. 30, 2009, the disclosures of which are expressly incorporated by reference herein.

BACKGROUND OF THE INVENTION

1. Field of the Invention

The present invention relates to a vehicle dynamics control device that controls the braking force and the driving force imparted to each wheel so as to achieve an optimal state of vehicle dynamics.

2. Description of Related Art

There are devices known in the related art that slow the subject vehicle so as to achieve an optimal speed for avoiding a collision with an obstacle present ahead of the subject vehicle or for traveling along a curve ahead of the subject vehicle through an automatic downshift or an automatic brake engagement in correspondence to the particular obstacle or curve (see, for instance, Japanese Laid Open Patent Publication No. H6-36187 and Japanese Laid Open Patent Publication No. H10-269499). While such a device calculates the required deceleration and slows the vehicle based on information indicating details of the obstacle, the curve or the like present ahead, there is a concern that the wheels may skid to an excessive extent due to the automatic deceleration under certain conditions including a condition in which the friction coefficient of the road surface is low.

In addition, when regenerative braking control is executed in an electric car or a hybrid electric vehicle traveling on a road with a low coefficient of friction, deceleration control may cause the wheels to skid to an excessive extent. In particular, as control is executed to apply a greater braking force to the rear wheels than to the front wheels in an electric car equipped with an electric motor installed at the rear wheels in order to regenerate a greater amount of energy at the rear wheels, the rear wheels may skid to an excessive extent to compromise the stability of the vehicle dynamics.

Methods that have been proposed as means for addressing these issues include a method whereby the automatic deceleration control is terminated upon detecting excessive skidding of the wheels, a method whereby deceleration control is executed by engaging an antilock braking system for preventing the wheels from locking up and a method whereby the risk of a skid is estimated based upon the temperature, the state of wear of the tires or the condition of the driver, and the deceleration to be achieved is corrected accordingly (see, for instance, Japanese Laid Open Patent Publication No. H6-1229 and Japanese Laid Open Patent Publication No. 2007-216839).

SUMMARY OF THE INVENTION

However, after the control is terminated upon detecting a skid, the driver will need to induce the required deceleration on his own immediately and thus, a sufficient level of ease of use is not assured by the device. In addition, when a lock-up at the wheels that would otherwise occur under automatic deceleration control is disallowed via an antilock braking system, excessive skidding occurs immediately before the antilock braking system is engaged and thus, the drivability during the automatic deceleration becomes poor. In particular, when the driver steers the vehicle undergoing automatic deceleration, e.g., when the vehicle slows down in order to negotiate a curve, such an excessive skid lowers the responsiveness of the vehicle to a steering operation performed by the driver, to result in poor handling. The method disclosed in Japanese Laid Open Patent Publication No. 2007-216839 for estimating the risk of skidding requires an enormous volume of information in order to execute accurate deceleration control in various driving situations.

The present invention, having been achieved by addressing the issues discussed above, provides a vehicle dynamics control device capable of achieving automatic acceleration/deceleration while assuring a high level of drivability even when the road friction coefficient changes.

According to the 1st aspect of the present invention, a vehicle dynamics control device, comprises: a control unit that executes braking/driving torque control for controlling at least either a braking torque or a driving torque at each wheel based upon at least either external information pertaining to an environment of a vehicle or vehicle information that includes operation input information indicating an operation input by a driver and a vehicle dynamics information. And the operation input information includes a lateral motion operation index pertaining to a lateral motion operation executed to generate a lateral motion in the vehicle; the vehicle dynamics information includes a longitudinal acceleration generated in the vehicle and a lateral motion index indicating a lateral motion occurring in the vehicle; and the control unit determines a handling assurance acceleration limit with a maximum longitudinal acceleration value that assumes a substantially linear proportional relationship with the lateral motion operation index and the lateral motion index over a range in which the lateral motion operation index assumes a value equal to or less than a predetermined value or the lateral motion index assumes a value equal to or less than a predetermined value, and executes the braking/driving torque control by setting the handling assurance acceleration limit as an upper limit to a longitudinal acceleration to be generated in the vehicle under the braking/driving torque control.

According to the 2nd aspect of the present invention, in the vehicle dynamics control device according to the 1st aspect, it is preferred that: the lateral motion operation index is made up with part of or the whole of an absolute value representing a steering angle or an absolute value representing a side slip angle; and the lateral motion index is made up with at least part of or the whole of an absolute value representing a lateral acceleration generated in the vehicle or an absolute value representing a yaw rate generated in the vehicle.

According to the 3rd aspect of the present invention, in the vehicle dynamics control device according to the 1st aspect, it is preferred that the predetermined value referenced for the lateral motion operation index and the predetermined value referenced for the lateral motion index are each at least one of a preselected value, a value entered by the driver and a value set based upon at least either the external information or the operation input information.

According to the 4th aspect of the present invention, in the vehicle dynamics control device according to the 1st aspect, it is preferred that the maximum longitudinal acceleration value is set based upon a value selected based upon an extent of nonlinearity of a braking/driving force generated at each wheel relative to a braking/driving torque control input, an acceleration limit indicating a limit to acceleration that can be generated at a road surface upon which the subject vehicle is traveling, determined through estimation or detection, and the handling assurance acceleration limit.

According to the 5th aspect of the present invention, in the vehicle dynamics control device according to the 1st aspect, it is preferred that, the vehicle dynamics control device further comprises: a first braking torque input unit via which the driver enters a braking torque with an upper limit to a longitudinal force to be generated set with a friction force limit or an upper limit to an acceleration to be generated set with a acceleration limit; and a second braking torque input unit via which the driver enters a braking torque with an upper limit to a braking force to be generated set with a handling assurance limit or an upper limit to the acceleration to be generated set with the handling assurance acceleration limit.

According to the 6th aspect of the present invention, in the vehicle dynamics control device according to the 1st aspect, it is preferred that, the vehicle dynamics control device further comprises: a first driving torque input unit via which the driver enters a driving torque with an upper limit to a longitudinal force to be generated set with a friction force limit or an upper limit to an acceleration to be generated set with a acceleration limit; and a second driving torque input unit via which the driver enters a driving torque with an upper limit to a braking force to be generated set with the handling assurance limit or an upper limit to the acceleration to be generated set as the handling assurance acceleration limit.

According to the 7th aspect of the present invention, a vehicle dynamics control device, comprises: a control unit that executes braking/driving torque control for controlling at least either a braking torque or a driving torque for each wheel based upon at least either external information pertaining to the environment of the vehicle or vehicle information that includes operation input information indicating an operation input by a driver and vehicle dynamics information. And the operation input information includes a lateral force operation index pertaining to a lateral force operation executed to generate a lateral force at the wheel; the vehicle dynamics information includes a wheel lateral force index indicating a lateral force generated at the wheel; and the control unit determines a handling assurance limit with a maximum longitudinal force value that assumes a substantially linear proportional relationship with the lateral force operation index and the wheel lateral force index over a range in which the lateral force operation index assumes a value equal to or less than a predetermined value or the wheel lateral force index assumes a value equal to or less than a predetermined value, and executes the braking/driving torque control by setting the handling assurance limit as an upper limit to a longitudinal force to be generated in the vehicle under the braking/driving torque control.

According to the 8th aspect of the present invention, in the vehicle dynamics control device according to the 7th aspect, it is preferred that: the lateral force operation index is made up with part of or the whole of an absolute value representing a steering angle or an absolute value representing a side slip angle; and the lateral force index is made up with part of or the whole of a lateral force generated at the wheel, an absolute value representing a lateral acceleration generated in the vehicle or an absolute value representing a yaw rate generated in the vehicle.

According to the 9th aspect of the present invention, in the vehicle dynamics control device according to the 7th aspect, it is preferred that the predetermined value referenced for the lateral force operation index and the predetermined value referenced for the lateral force index are each at least one of a preselected value, a value entered by the driver and a value set based upon at least either the external information or the operation input information.

According to the 10th aspect of the present invention, in the vehicle dynamics control device according to the 7th aspect, it is preferred that the maximum longitudinal acceleration value is set based upon a value selected based upon an extent of nonlinearity of a braking/driving force generated at each wheel relative to a braking/driving torque control input, a friction force limit with regard to a longitudinal force that can be generated at a road surface upon which the subject vehicle is traveling, determined through estimation or detection and the handling assurance limit.

According to the 11th aspect of the present invention, in the vehicle dynamics control device according to the 7th aspect, it is preferred that, the vehicle dynamics control device further comprises: a first braking torque input unit via which the driver enters a braking torque with an upper limit to the longitudinal force to be generated set with a friction force limit or an upper limit to an acceleration to be generated set with a acceleration limit; and a second braking torque input unit via which the driver enters a braking torque with an upper limit to a braking force to be generated set with the handling assurance limit or an upper limit to the acceleration to be generated set with a handling assurance acceleration limit.

According to the 12th aspect of the present invention, in the vehicle dynamics control device according to the 7th aspect, it is preferred that, the vehicle dynamics control device further comprises: a first driving torque input unit via which the driver enters a driving torque with an upper limit to a longitudinal force to be generated set with a friction force limit or an upper limit to the acceleration to be generated set with a acceleration limit; and a second driving torque input unit via which the driver enters a driving torque with an upper limit to a braking force to be generated set with the handling assurance limit or an upper limit to the acceleration to be generated set with a handling assurance acceleration limit.

BRIEF DESCRIPTION OF THE DRAWINGS

FIG. 8 is a conceptual diagram indicating a relationship between the friction force limit and the steerability assurance limit observed in the embodiment of the present invention;

FIG. 15 is a conceptual diagram indicating a relationship between the friction force acceleration limit and the steerability assurance acceleration limit observed in the first embodiment of the present invention;

DESCRIPTION OF PREFERRED EMBODIMENTS (Setting Wheel Longitudinal Force Upper Limit for Braking/Driving Force Control)

In order to ensure that the embodiments to be described below will be understood with ease, the concept of the wheel longitudinal force upper limit that may be set for braking/driving force control in an embodiment of the present invention, is first explained in reference to FIGS. 1 through 8.

Figure 1:
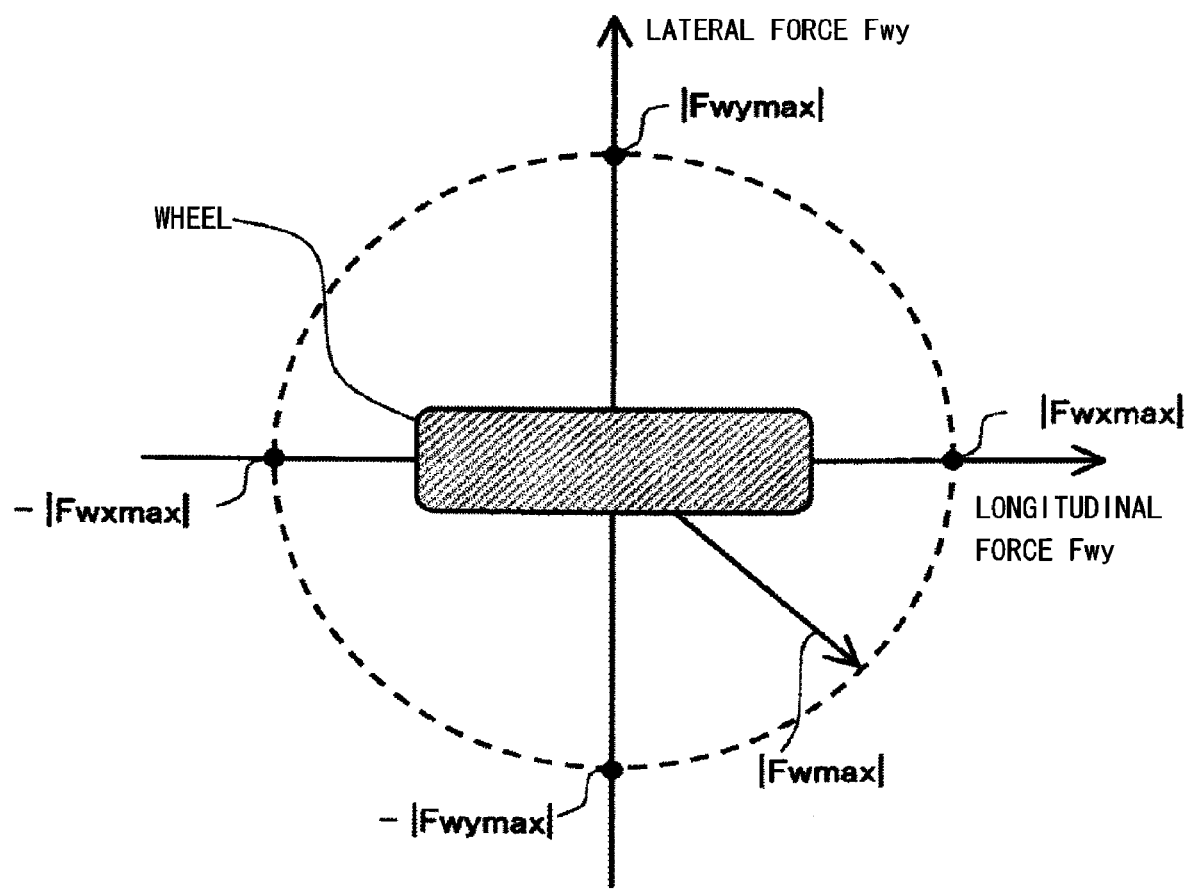
FIG. 1 is a conceptual diagram of forces acting on a wheel in an embodiment of the present invention.

FIG. 1 presents a conceptual diagram indicating the relationship among the longitudinal force Fwx and the lateral force Fwy generated at a wheel of the subject vehicle and the friction force limit |Fwmax| representing the maximum value for the force that can be generated at the wheel. As shown in FIG. 1, the maximum value of the combined force representing the sum of the longitudinal force Fwx and the lateral force Fwy that can be generated at the wheel, can be approximated as a circle that assumes the friction force limit |Fwmax| as the radius thereof. The absolute value |Fwy| of the lateral force that can be generated decreases as the absolute value |Fwx| of the longitudinal force increases, and the absolute value |Fwy| of the lateral force that can be generated is substantially equal to 0 when the longitudinal force absolute value |Fwx| is very close to the maximum value |Fwxmax|. This means that when the subject vehicle approaching, for instance, a curve, is decelerating by generating a longitudinal force close to −|Fwxmax| under automatic deceleration control, a lateral force FwyREQ required for the vehicle to turn along the curve may not be generated.

If the longitudinal force having been generated at the wheel is decreased to an excessive extent in order to generate the required lateral force FwyREQ, the absolute value |Gtotal| of the acceleration generated at the body is reduced abruptly, which will result in poor driving feel for the driver. In addition, even when the longitudinal force absolute value |Fwx| is determined simply by focusing on the level of the combined force generated at the wheel (e.g., when the longitudinal force absolute value |Fwx| to be achieved is determined so that the sum of the squares of the required lateral force absolute value |FwyREQ| and the longitudinal force absolute value |Fwx| matches the square of the friction force limit |Fwxmax|), it is not guaranteed that the desirable lateral acceleration intended for the operation performed to cause lateral motion of the vehicle (hereafter referred to as a steering operation) will be generated, since the responsiveness of the lateral force Fwy to the steering operation is not taken into consideration.

In the embodiment, a braking/driving force control quantity is determined by taking into consideration the responsiveness of the lateral force Fwy to the steering operation without abruptly decreasing the absolute value |Gtotal| of the acceleration being generated at the body.

First, factors that may cause changes in the lateral force Fwy generated at the wheel are examined. The change occurring over time in the lateral force Fwy generated at the wheel, affected by a wheel slip ratio sw, a wheel side slip angle βw and a wheel load Ww, is expressed as below.

[Expression 1]

$$\frac{dFwy}{dt} = \frac{\partial Fwy}{\partial \beta w} \cdot \frac{d\beta w}{dt} + \frac{\partial Fwy}{\partial sw} \cdot \frac{dsw}{dt} + \frac{\partial Fwy}{\partial Ww} \cdot \frac{dWw}{dt} \quad (1)$$

Since Fwy and βw have a substantially linear relation to each other (∂Fw/∂βw is substantially constant) expression (1) can be rewritten as follows by multiplying the two sides by dt/dβw over a range within which the wheel load Ww changes (dWw/dβw) to a small extent relative to the change in the side slip angle. It is to be noted that while the wheel side slip angle βw may take on either a positive value or a negative value depending upon the direction of the side slip, the following description is provided by assuming that the size alone of the angle is relevant and thus by using the absolute value to represent the side slip angle.

[Expression 2]

$$\frac{dFwy}{d\beta w} = \frac{\partial Fwy}{\partial \beta w} + \frac{\partial Fwy}{\partial sw} \cdot \frac{dsw}{d\beta w} \quad (2)$$

As expression (2) above indicates, the wheel slip ratio sw determines the extent to which the lateral force absolute value |Fwy| changes relative to the wheel side slip angle absolute value |βw|. When the wheel longitudinal force absolute value

|Fwx| is extremely small, i.e., within the range over which the wheel slip ratio sw is extremely low, the second term (∂Fw/∂sw·dsw/dβw) in expression (2) assumes a value substantially equal to 0 and thus, |Fwy| changes entirely in correspondence to |βw|. However, as the wheel longitudinal force absolute value |Fwx| increases and the wheel slip ratio sw also increases, the significance of the second term (∂Fw/∂sw·dsw/dβw) in expression (2) can no longer be disregarded. ∂Fwy/∂sw in the second term (∂Fwy/∂sw·dsw/dβw) and ∂sw/∂βw are now examined.

Figure 2A:
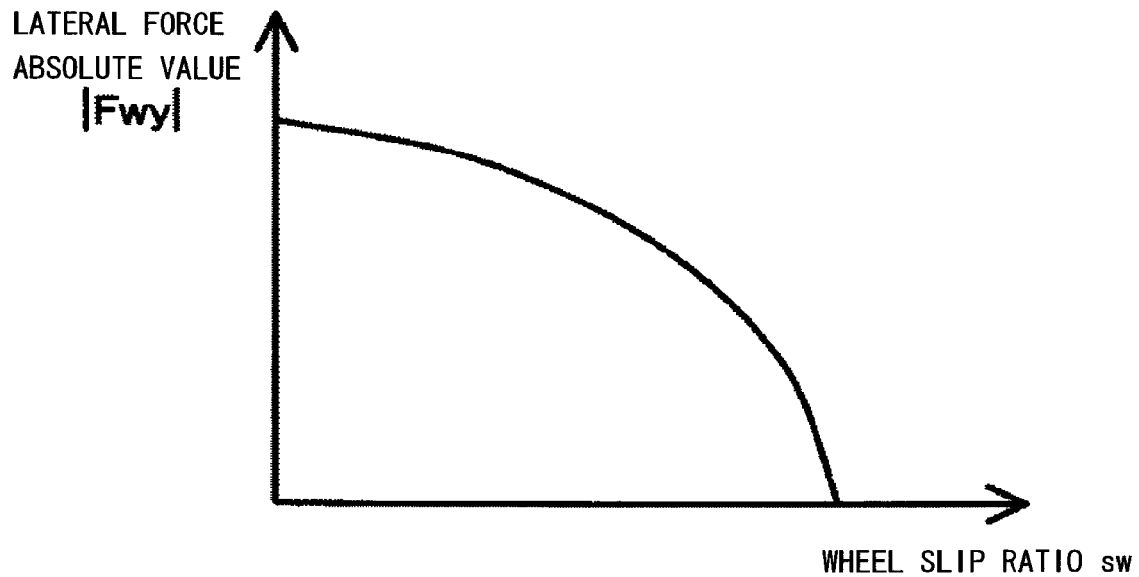
FIGS. 2A and 2B are conceptual diagrams indicating a relationship between the wheel slip ratio and the lateral force observed in the embodiment of the present invention.
Figure 2B:
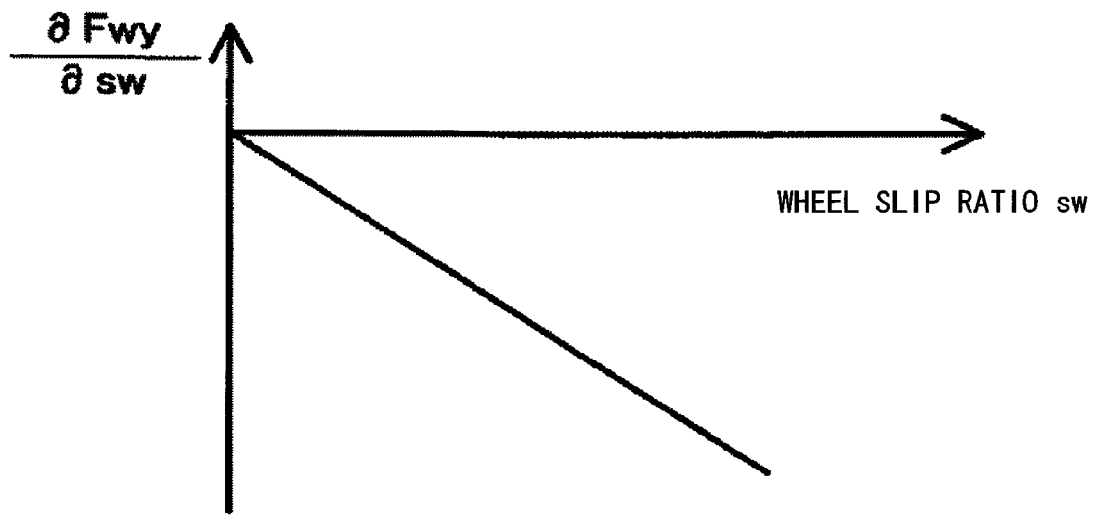

By expressing the relationship between the wheel slip ratio sw and the lateral force absolute value |Fwy| through quadratic approximation as indicated in FIG. 2A, the relationship between ∂Fwy/∂sw and sw can be represented by a monotonously decreasing linear graph such as that shown in FIG. 2B. This indicates that when a longitudinal force taking on the absolute value |Fwx| is generated, ∂Fwy/∂sw takes on a negative value, which decreases as the longitudinal force absolute value |Fwx| increases.

Figure 3A:
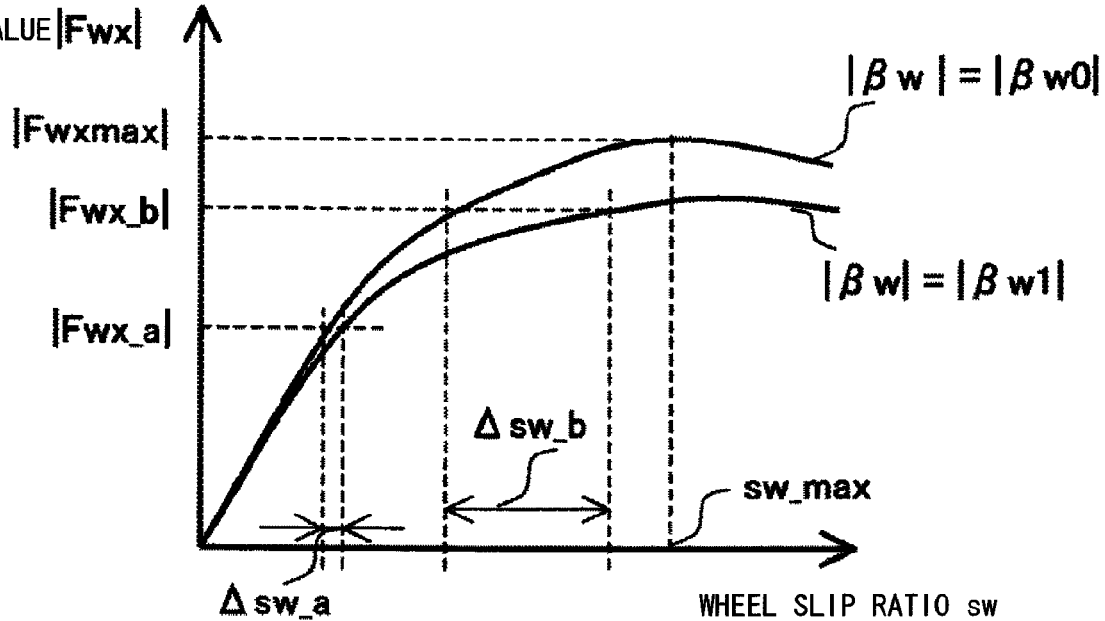
FIGS. 3A and 3B are conceptual diagrams indicating a relationship between the wheel slip ratio and the longitudinal force absolute value observed in the embodiment of the present invention.

Next, ∂sw/∂βw is examined in reference to FIG. 3A presenting a conceptual diagram indicating a relationship that may be observed among the longitudinal force absolute value |Fwx|, the wheel slip ratio sw and the side slip angle absolute value |βw|. As FIG. 3A indicates, the wheel slip ratio sw and the longitudinal force absolute value |Fwx|, sustaining a substantially linear relationship while the wheel slip ratio sw remains low, assumes a nonlinear relationship when the wheel slip ratio is close to sw_max, at which the longitudinal force absolute value peaks at the maximum value |Fwxmax|. In addition, as the side slip angle absolute value |βw| changes from |βw0| to |βw1|, the wheel slip ratio sw demonstrates a tendency to increase relative to a given longitudinal force absolute value |Fwx|. The extent of such an increase is greater when the longitudinal force absolute value |Fwx| is greater.

Figure 3B:
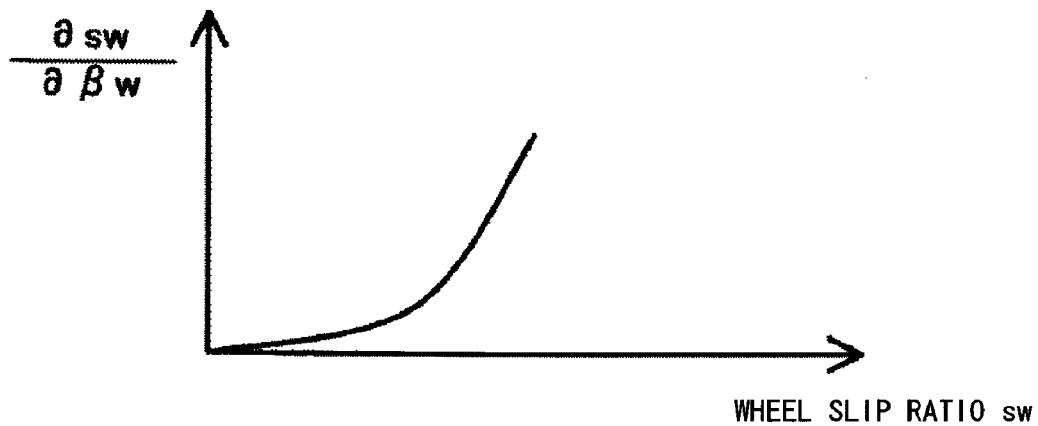

For instance, the degree of change |Δsw_b| in the wheel slip ratio required to sustain the longitudinal force absolute value |Fwx_b| is greater than the degree of change |Δsw_a| in the wheel slip ratio required to sustain the longitudinal force absolute value |Fwx_a| when the side slip angle absolute value |βw| increases from |βw0| to |βw1|, as shown in FIG. 3A (|Fwx_a|<|Fwx_b|). In other words, the degree of change Δsw in the wheel slip ratio occurring as the side slip angle absolute value |βw| increases is greater in the range over which the longitudinal force absolute value |Fwx| assumes greater values, i.e., in the range over which the wheel slip ratio sw is more significant, rather than in the range over which the longitudinal force absolute value |Fwx| assumes smaller values, i.e., in the range over which the wheel slip ratio sw is less significant. In particular, when the nonlinearity of the longitudinal force absolute value |Fwx| relative to the wheel slip ratio sw is more pronounced, the extent of change Δsw in the wheel slip ratio increases more significantly in correspondence to an increase in the side slip angle absolute value |βw|. ∂sw/∂βw relative to the wheel slip ratio sw can thus be graphed as shown in FIG. 3B.

Figure 4:
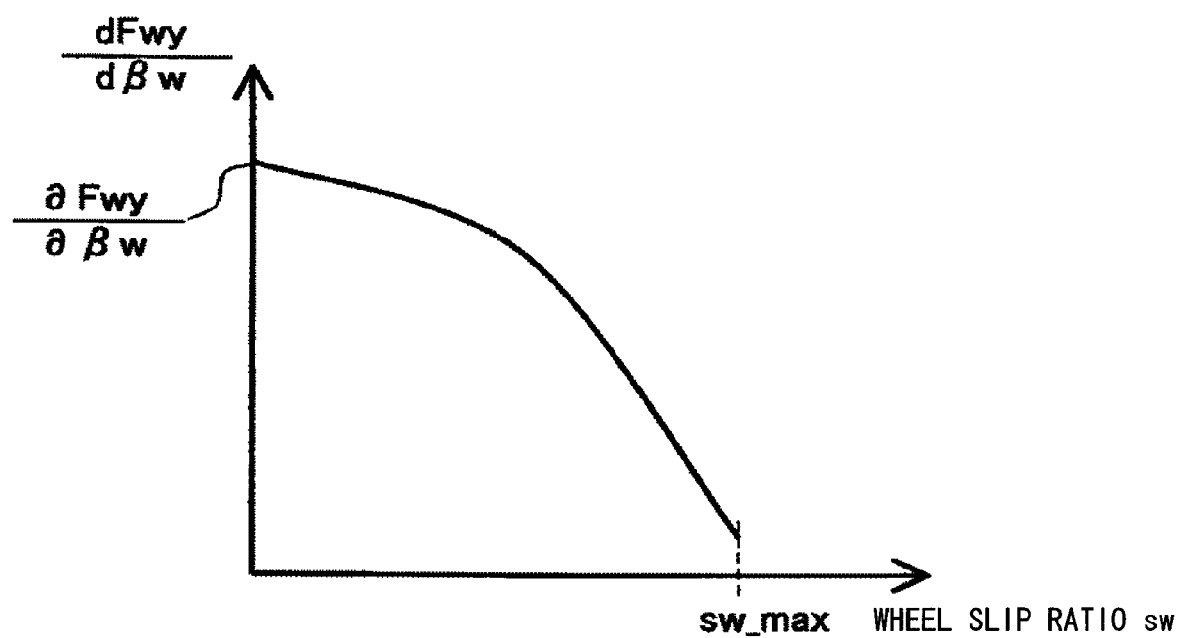
FIG. 4 is a conceptual diagram indicating a relationship between the wheel slip ratio and the extent to which the lateral force changes relative to the side slip angle.

The logic provided above indicates that the second term (∂Fwy/∂sw·dsw/dβw) in expression (2) increases along the negative direction as the wheel slip ratio sw increases. Accordingly, dFwy/dβw decreases as the wheel slip ratio sw increases and it decreases particularly drastically when the wheel slip ratio is close to sw_max, as shown in FIG. 4. A decrease in dFwy/dβw signifies a smaller extent of increase in the lateral force Fwy generated as the wheel side slip angle βw is increased and constitutes a factor for lowering the lateral acceleration responsiveness to a steering operation.

Figure 5A:
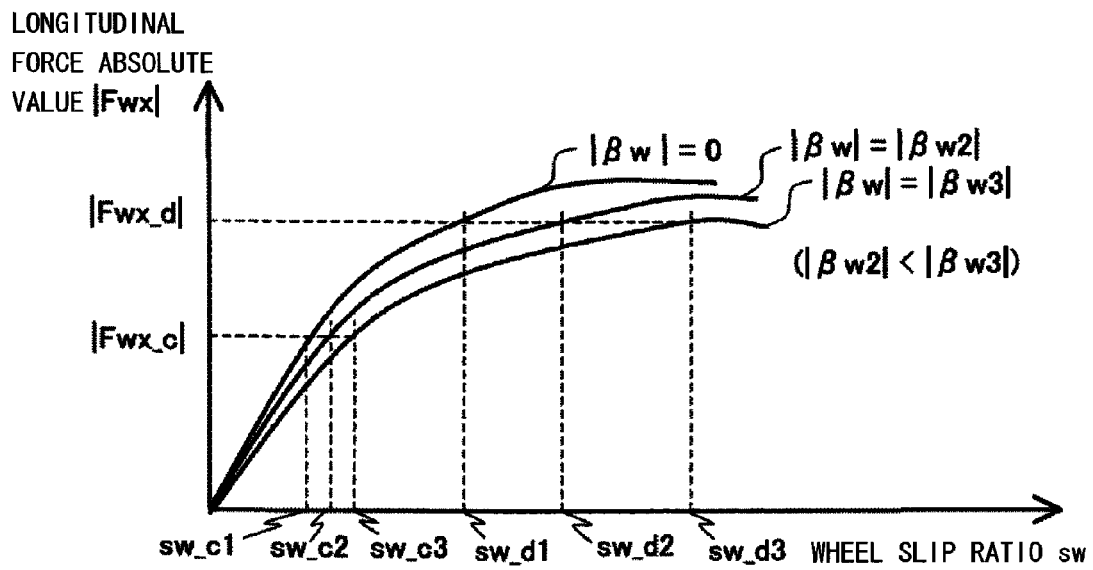
FIGS. 5A and 5B are conceptual diagrams respectively indicating a relationship between the wheel slip ratio and the longitudinal force absolute value and a relationship between the wheel slip ratio and the extent to which the lateral force changes relative to the side slip angle, observed in the embodiment of the present invention.
Figure 5B:
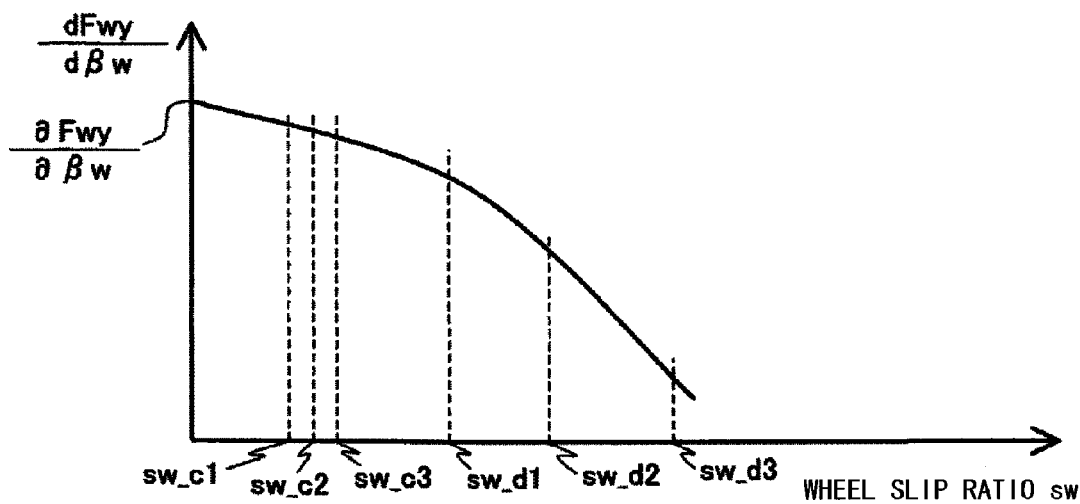

For instance, the side slip angle absolute value |βw| may be increased from 0 to |βw2| and then to |βw3| at a wheel twice in a similar manner, one while a longitudinal force represented by an absolute value |Fwx_c| is generated and another while a longitudinal force represented by an absolute value |Fwy_d| is generated. Under such circumstances, the wheel slip ratio will change from sw_c1 to sw_c2 and then to sw_c3 in correspondence to the longitudinal force absolute value |Fwx_c|, whereas the wheel slip ratio will change from sw_d1 to sw_d2 and then to sw_d3 in correspondence to the longitudinal force absolute value |Fwx_d|, as shown in FIG. 5A. While dFwy/dβw will only decrease slightly in correspondence to the longitudinal force absolute value |Fwx_c|, dFwy/dβw will decrease to an extremely large extent in correspondence to the longitudinal force absolute value |Fwx_d|, as indicated in FIG. 5B.

Figure 6A:
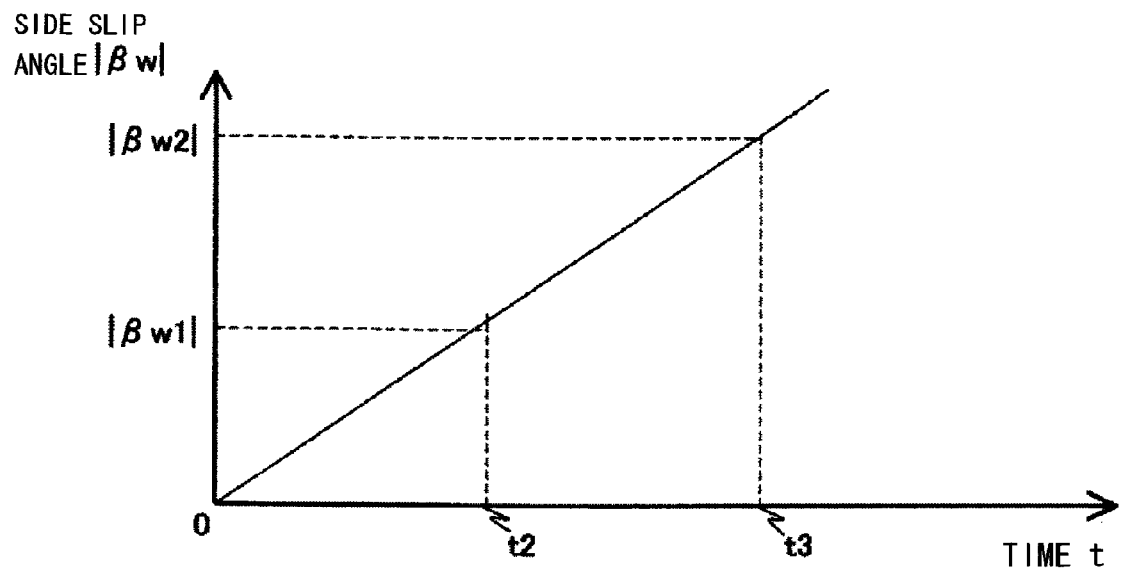
FIGS. 6A and 6B are conceptual diagrams indicating changes in the side slip angle and in the lateral force over time, observed in the embodiment of the present invention.
Figure 6B:
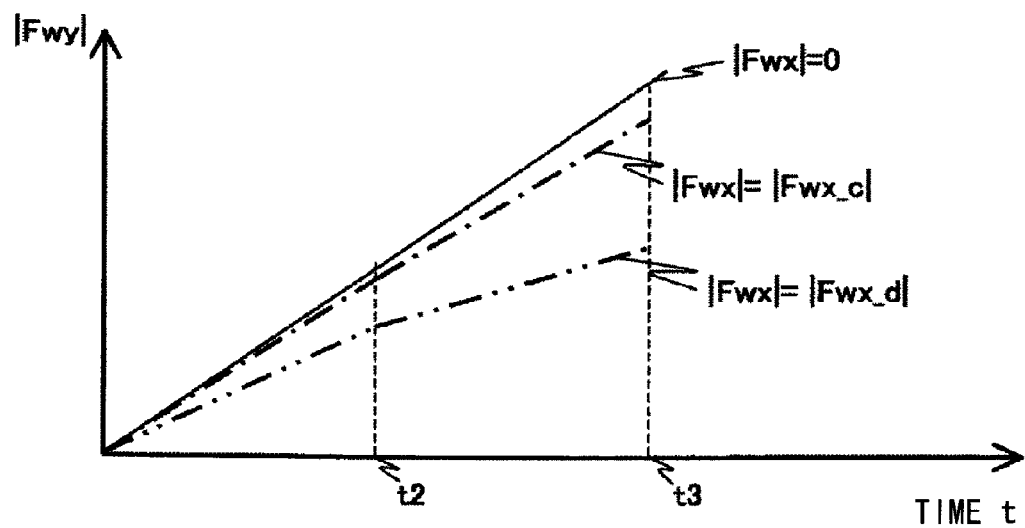

This means that as the side slip angle absolute value |βw|, assuming the value of 0 at a time point t=0, changes at t=t2 to |βw2| and further changes at t=t3 to |βw3|, as shown in FIG. 6A, the absolute values |Fwy| of the lateral forces generated at |Fwx|=0, |Fwx|=|Fwx_c| and |Fwx|=|Fwx_d| will individually change as indicated in FIG. 6B. In other words, the absolute value |Fwy| of the lateral force generated at a given side slip angle absolute value |βw| varies greatly in correspondence to the longitudinal force absolute value |Fwx|. In particular, the absolute value |Fwy| of the lateral force generated in the range over which the longitudinal force changes nonlinearly relative to the wheel slip ratio is extremely small compared to the lateral force absolute value assumed under conditions in which there is no longitudinal force.

Under a condition whereby the longitudinal force absolute value |Fwx| is equal to |Fwx_d|, as indicated in FIGS. 5A, 5B, 6A and 6B, the responsiveness of the lateral acceleration to changes in a steering operation is poor even immediately after the start of the steering operation, leaving the driver with a sense of intense discomfort. Furthermore, since this is likely to cause the driver to over-steer, stability in the vehicle dynamics may be disrupted. When the side slip angle is increased while the longitudinal force absolute value |Fwx| is equal to |Fwx_d|, the increase in the wheel slip ratio can be minimized and the absolute value |Fwy| of the lateral force being generated can be increased by reducing the braking/driving torque applied to the wheel in correspondence to the increase in the side slip angle.

However, the braking/driving torque needs to be controlled with high precision correspondence to the increase in the side slip angle in the range over which the longitudinal force absolute value |Fwx| changes nonlinearly relative to the wheel slip ratio and, depending upon the performance level of the actuator that generates the braking/driving torque, the lateral force absolute value |Fwy| cannot easily be increased as intended. In addition, in the range over which the longitudinal force absolute value |Fwx| demonstrates pronounced nonlinearity relative to the wheel slip ratio, the longitudinal force absolute value |Fwx| of the longitudinal force being generated may become decreased to an excessive extent as the braking/driving torque is reduced in order to increase the lateral force absolute value |Fwy| as intended. Under such circumstances, the longitudinal acceleration absolute value |Gx| is bound to decrease by an extent greater than the extent to which the lateral acceleration absolute value |Gy| increases and, as a result, the total acceleration |Gtotal| representing the combined acceleration generated at the vehicle will decrease, resulting in discomfort experienced by the driver and compromised maneuverability due to a sudden decrease in the longitudinal acceleration occurring immediately after a steering operation.

Based upon the observations outlined above, it can be concluded that in order to assure the required vehicle handling during automatic acceleration or deceleration, wheel slip ratio control should be executed in correspondence to the wheel side slip angle as described above via the actuator that generates the braking/driving torque by controlling the longitudinal force being generated within an optimal range without reducing the longitudinal force absolute value |Fwx| to an excessively small value. For instance, when the extent of change dFwy/dβw in the lateral force Fwy relative to the wheel side slip angle βw is equal to or greater than FyBlmt in the range over which the side slip angle |βw| is equal to or less than |βw3|, an upper limit value to the longitudinal force |Fwx_e| at which the wheel slip ratio sw_e3 corresponding to dFwy/dβw=FyBlmt matches the wheel slip ratio corresponding to the side slip angle |βw|=|βw3| may be taken so as to assure a certain level of responsiveness of the lateral force to a steering operation without decreasing the longitudinal force at the steering start, as indicated in FIGS. 7A and 7B.

FIG. 8 presents a conceptual diagram illustrating the concept of the embodiment. As shown in FIG. 8, the automatic control of vehicle acceleration/deceleration achieved in the embodiment is distinguishable from the control in the related art under which the forces are generated in reference to the friction force limit set as the upper limit, in that control for forces being generated is executed in reference to another upper limit value (handling assurance limit) set by taking into consideration the required operability. Through the embodiment, a high level of vehicle handling is assured for the driver during automatic acceleration/deceleration and also, a wider operational range is assured for the driver when the friction level is close to the friction force limit, compared to the driver operational range assured under the control in the related art executed in reference to the friction force limit set as the upper limit. For instance, while a force −|FwD| is being generated under automatic acceleration/deceleration control, the driver is allowed to choose to either generate a force along the longitudinal direction or to generate a force along the lateral direction, as indicated in FIG. 8.

Figure 7A:
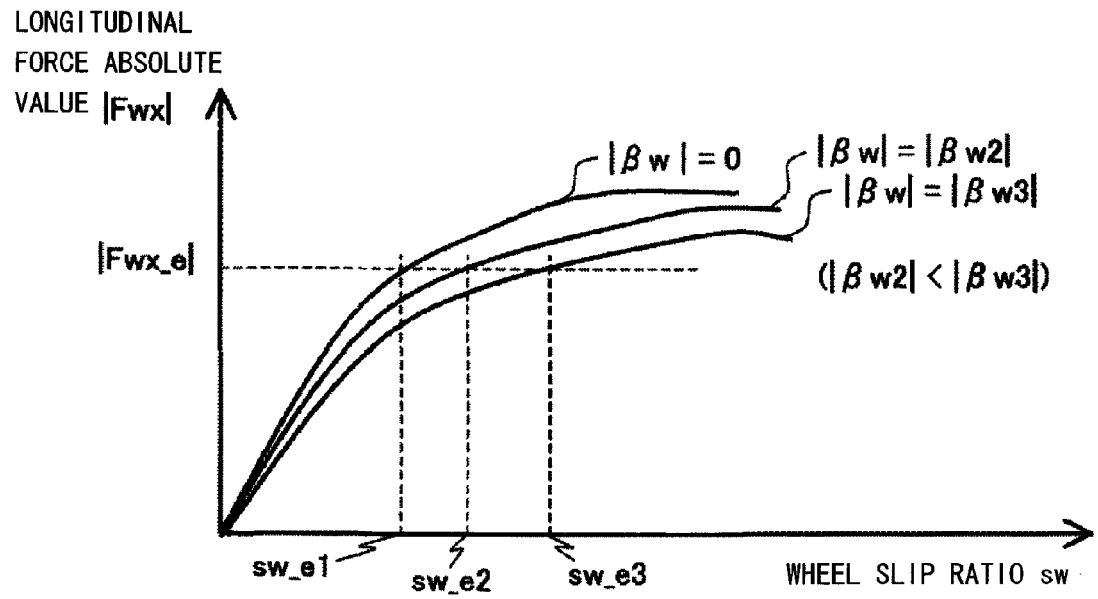
FIGS. 7A and 7B are conceptual diagrams respectively indicating a relationship between the wheel slip ratio and the longitudinal force absolute value and a relationship between the wheel slip ratio and the extent to which the lateral force changes relative to the side slip angle, observed in the embodiment of the present invention.
Figure 7B:
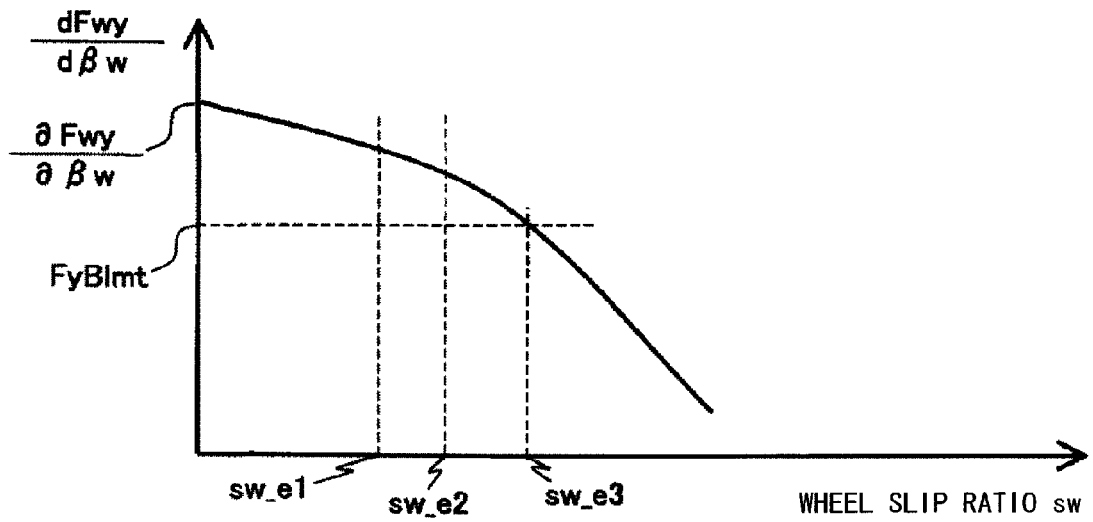

It is to be noted that the handling assurance limit in FIG. 8 may be set through a method other than that shown in FIGS. 7A and 7B. For instance, as long as the friction force limit of each wheel can be detected or estimated with a high level of accuracy, the maximum value for the longitudinal force absolute value at which a given lateral force absolute value can be achieved may be set as the handling assurance limit for the longitudinal force. As an alternative, provided that the extent of non-linearity of the slip ratio relative to the longitudinal force can be detected, a longitudinal force set by ensuring that the extent of non-linearity does not exceed a specific value may be set as the handling assurance limit. As a further alternative, the longitudinal force to be generated at each wheel may be controlled by setting a handling assurance acceleration limit with regard to the acceleration generated at the vehicle through a method similar to that illustrated in FIG. 8, in addition to the friction force acceleration limit value used in the related art. For instance, the maximum value of the longitudinal acceleration absolute value in correspondence to which a given lateral acceleration absolute value can be achieved, may be designated as the handling assurance acceleration limit. A specific method that may be adopted when setting the steerability assurance limit will be described in detail later in reference to embodiment 1.

(First Embodiment)

In reference to FIGS. 9 through 15, the structure of the vehicle dynamics control device achieved in the first embodiment of the present invention and the operation executed therein are described.

Figure 9:
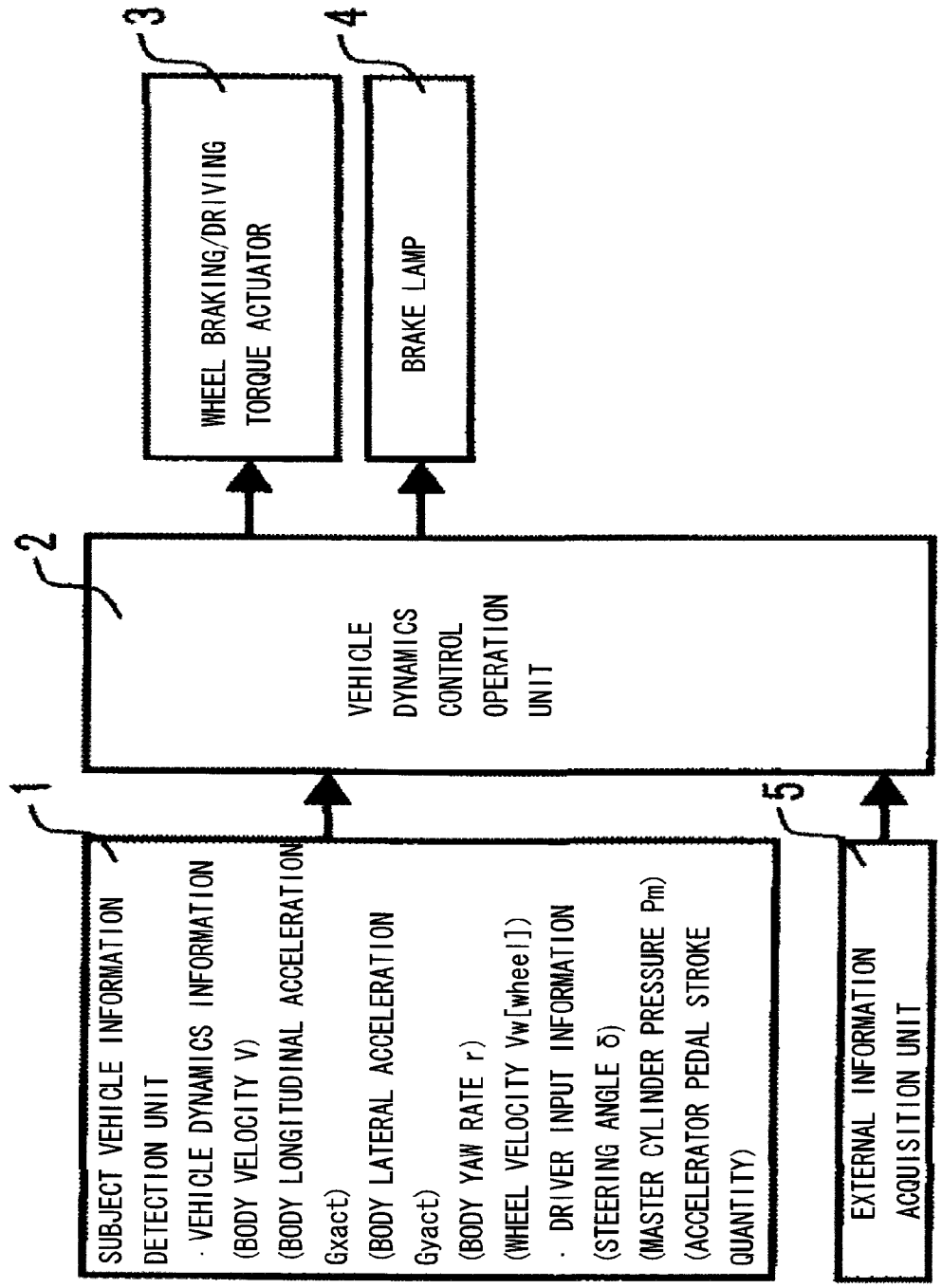
FIG. 9 is a system block diagram showing the structure adopted in the vehicle dynamics control device achieved in a first embodiment of the present invention.

First, in reference to FIG. 9, the structure adopted in the vehicle dynamics control device in the first embodiment of the present invention is described.

FIG. 9 is a system block diagram showing the structure of the vehicle dynamics control device achieved in the first embodiment of the present invention.

The vehicle dynamics control device achieved in the embodiment, which is installed in a vehicle, includes a subject vehicle information detection unit 1 that obtains information indicating subject vehicle dynamics conditions and an operation quantity representing the extent to which the subject vehicle is operated by the driver, a vehicle dynamics control operation unit 2 that provides control commands to braking/driving force actuators and the like, a wheel braking/driving torque actuator 3 that generate a braking/driving torque at the wheels based upon a command provided from the vehicle dynamics control operation unit 2, a brake lamp 4 that indicates to following vehicles that the subject vehicle is decelerating and an external information acquisition unit 5.

The subject vehicle information detection unit 1 takes in information indicating the steering angle δ, the body velocity V of the subject vehicle, the body longitudinal acceleration Gx, the body lateral acceleration Gy, the body yaw rate r, the wheel velocities Vw, the master cylinder pressure Pm, the accelerator pedal stroke quantity and the like input thereto. The means for obtaining the body velocity V may estimate the body velocity based upon wheel velocity information indicating the velocity of each wheel or may directly measure the body velocity via an external sensor or the like. In addition, the extent of driver operation may be ascertained based upon the steering torque or the brake pedal stroke quantity. A longitudinal acceleration change rate Jx and a lateral acceleration change rate Jy may also be input as information indicating subject vehicle dynamics conditions.

Based upon the steering angle δ, the subject vehicle body velocity V, the body longitudinal acceleration Gxact, the body lateral acceleration Gyact, the body yaw rate r, the wheel velocities Vw[wheel] ("wheel" is Fl (front left wheel) Fr (front right wheel), RL (rear left wheel) or RR (rear right wheel)), the master cylinder pressure Pm and the accelerator pedal stroke quantity obtained via the subject vehicle information detection unit 1, the vehicle dynamics control operation unit 2 calculates a vehicle dynamics control quantity and calculates drive control quantities indicating the extents of drive control to be executed on the wheel braking/driving torque actuator 3 and the brake lamp 4.

The braking/driving torque actuator 3, which generates a braking/driving torque at the wheels, may each be a brake actuator that generates a braking torque as a brake pad is pressed against a brake disk in the wheel or as a shoe is pressed against a drum at the wheel, an engine drive actuator that generates a driving torque as it transmits engine torque generated by an engine to the wheel via a gearbox, or a braking/driving motor actuator that generates a braking/driving torque by transmitting a motor torque to the wheel.

The external information acquisition unit 5 takes in information input thereto, indicating the relative distance of an obstacle present around the subject vehicle to the subject vehicle, the relative velocity, the relative acceleration, and the width of the obstacle, the shape of the course extending along the subject vehicle advancing direction, the condition of the road surface, the lane width, the presence of traffic lights present along the subject vehicle path and the like. Such external information may be obtained via an obstacle recognition means such as a laser radar, a millimeter wavelength sensor or a camera or via a communication means such as vehicle-to-vehicle communication, road-to-vehicle communication or GPS.

Next, in reference to FIGS. 10 through 14B, the method adopted by the vehicle dynamics control operation unit 2 in the embodiment when generating through arithmetic operation, control commands for the wheel braking/driving torque actuator is described.

Figure 10:
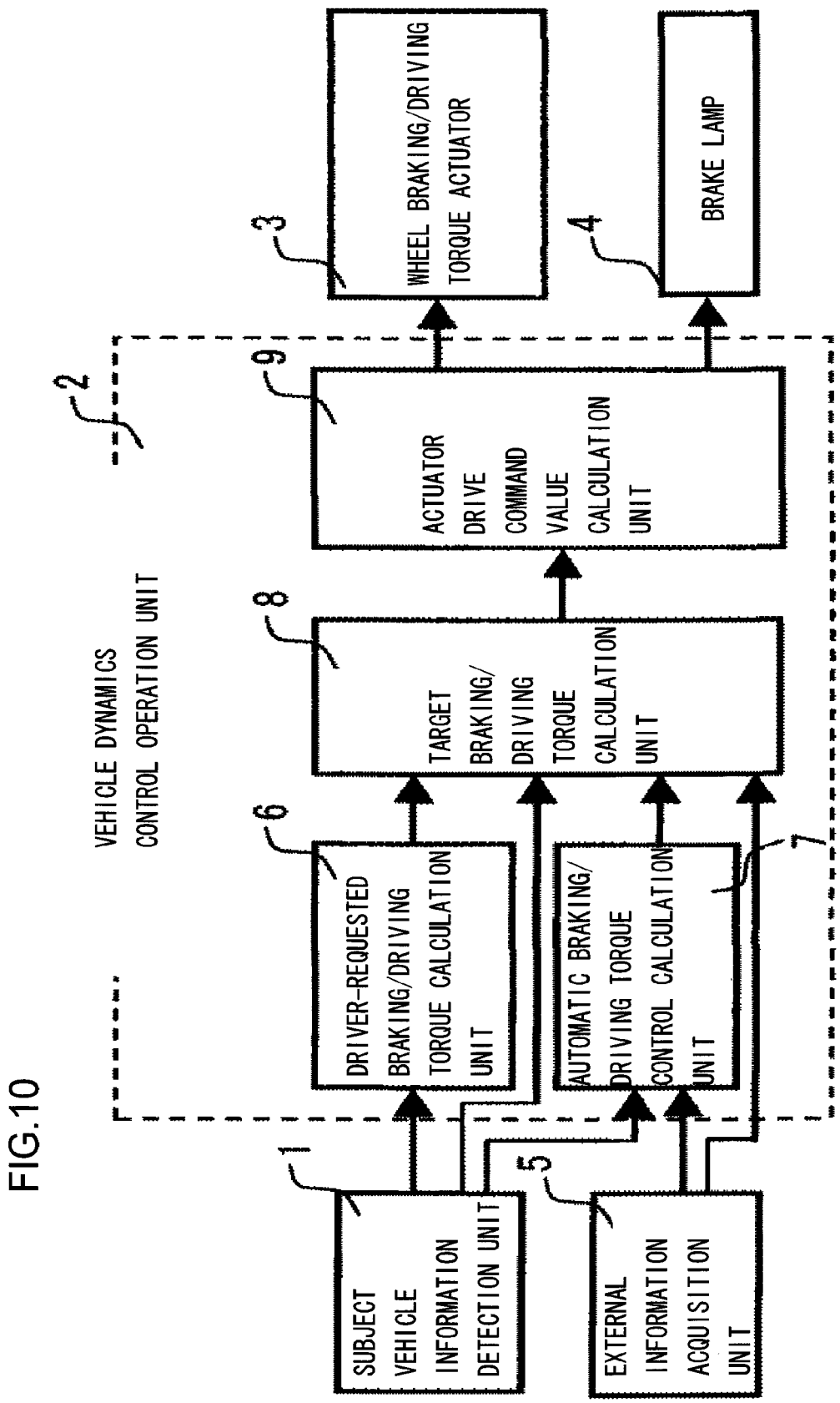
FIG. 10 is a system block diagram showing the structure adopted in the vehicle dynamics control unit achieved in the first embodiment of the present invention.

FIG. 10 presents a control block diagram pertaining to the control achieved via the vehicle dynamics control operation unit 2 in the first embodiment of the present invention.

As shown in FIG. 10, the vehicle dynamics control operation unit 2 includes a driver-requested braking/driving torque calculation unit 6, an automatic braking/driving torque control calculation unit 7, a target braking/driving torque calculation unit 8 and an actuator drive command value calculation unit 9.

The driver-requested braking/driving torque calculation unit 6 calculates the braking/driving torque for each wheel requested by the driver based upon the extent to which the driver has operated the accelerator pedal or the extent to which the driver has operated the brake pedal. For instance, if an engine torque generated via an engine is provided via a gearbox to the front wheels of the vehicle as a driving torque in the subject vehicle, the driving torque should be calculated in correspondence to the accelerator pedal stroke quantity. If, on the other hand, the subject vehicle is equipped with a brake actuator that hydraulically presses the brake pad at each wheel against a brake disk, the braking torque to be achieved via the brake actuator for each wheel should be calculated in correspondence to the master cylinder pressure generated in response to a brake pedal operation or in correspondence to the brake pedal stroke quantity. If a braking/driving torque is generated at each wheel via a braking/driving motor actuator in the subject vehicle, the driving torque to be achieved via the motor should be calculated in correspondence to the accelerator pedal stroke quantity and the braking torque to be achieved via the motor should be calculated in correspondence to the brake pedal stroke quantity or the master cylinder pressure.

Figure 11:
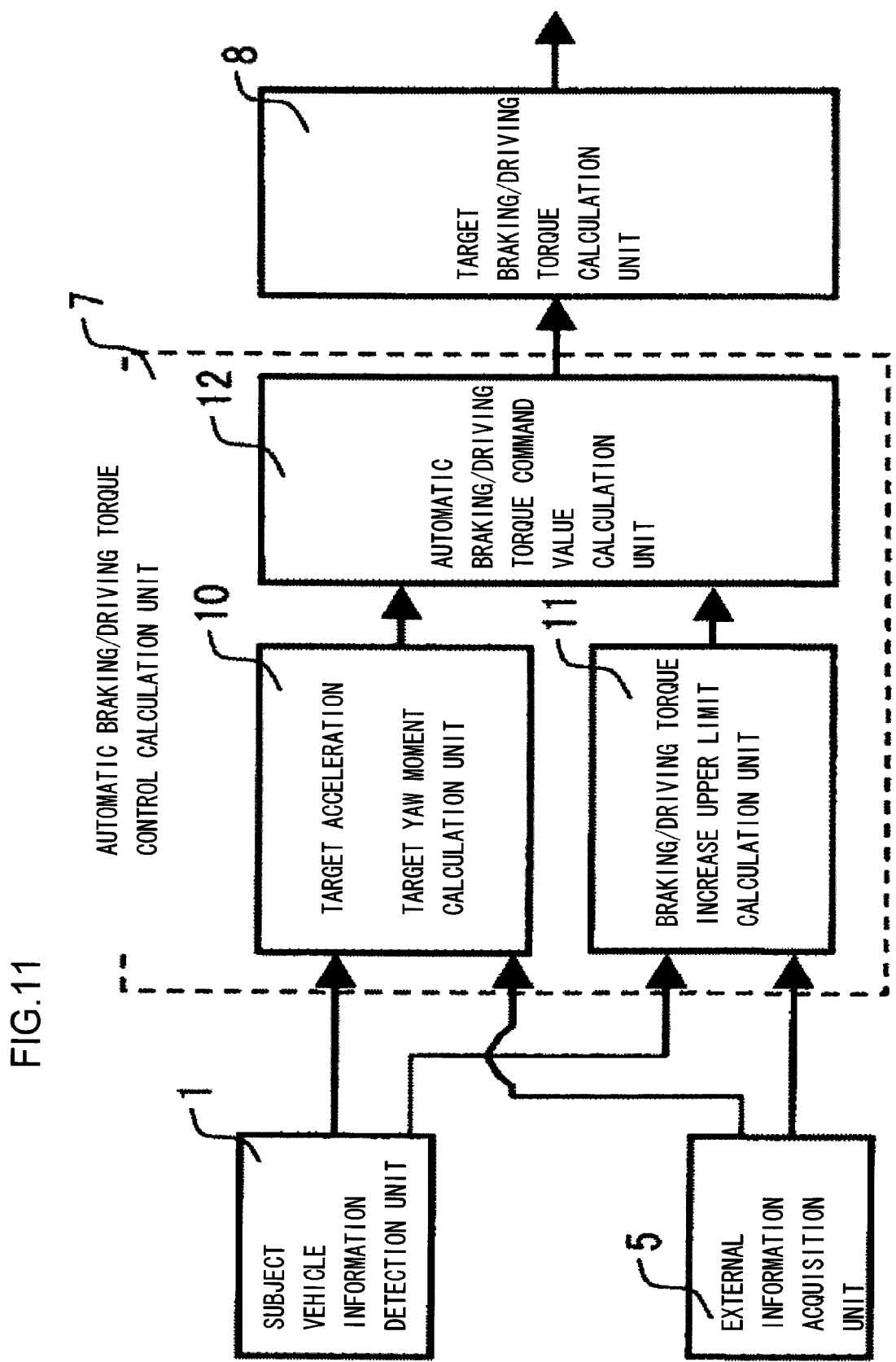
FIG. 11 is a system block diagram showing the structure adopted to enable automatic braking/driving torque control operation in the first embodiment of the present invention.

The automatic braking/driving torque control calculation unit 7 calculates the braking/driving torque to be generated in the subject vehicle based upon the subject vehicle information obtained via the subject vehicle information detection unit 1 and the external information obtained by the external information acquisition unit 5. FIG. 11 presents a control block diagram pertaining to the control executed via the automatic braking/driving torque control calculation unit 7.

As shown in FIG. 11, the automatic braking/driving torque control calculation unit 7 includes a target acceleration·target yaw moment calculation unit 10, a braking/driving torque increase upper limit calculation unit 11 and an automatic braking/driving torque command value calculation unit 12.

The target acceleration·target yaw moment calculation unit 10 determines through arithmetic operation either the acceleration or the yaw moment to be generated in the vehicle or both the acceleration and the yaw moment based upon the subject vehicle information and the external information.

For instance, under automatic acceleration control, triggered when the driver lets off the accelerator pedal, whereby required deceleration is achieved in correspondence to an obstacle or a curve present ahead along the subject vehicle advancing direction, which is ascertained based upon the external information, a target acceleration Gxtgt1 may be calculated as expressed below based upon the subject vehicle velocity V, the distance Ltgt to the obstacle or the curve and the target velocity Vtgt to be achieved at a position set apart by the distance Ltgt.

[Expression 3]
$$G_{xtgt1} = \frac{V^2 - V_{tgt}^2}{2 \cdot L_{tgt}} \quad (3)$$

If the automatic acceleration/deceleration control is executed for the subject vehicle about to negotiate a curve present ahead along the subject vehicle advancing direction, the target velocity Vtgt represents a curve entry velocity at which the vehicle should be able to turn along the curve at a given lateral acceleration, whereas if the automatic acceleration/deceleration control is executed for the subject vehicle about to negotiate an obstacle present ahead along the subject vehicle advancing direction, the target velocity Vtgt represents a velocity at which a collision with the obstacle can be avoided (e.g., a subject vehicle velocity of 0 relative to the obstacle).

In the case of automatic acceleration/deceleration control for controlling acceleration/deceleration in response to a steering operation without using any external information, a target acceleration Gxtgt2 can be calculated as expressed below based upon the lateral acceleration Gy generated in the subject vehicle.

[Expression 4]
$$G_{xtgt2} = -\frac{Cxy}{1+Ts} \cdot \frac{d|Gy|}{dt} \quad (Gy \neq 0) \quad (4)$$

[Expression 5]
$$G_{xtgt2} = 0 \quad (Gy = 0) \quad (5)$$

Cxy and T in the expression above respectively represent a gain and a time constant assuming preselected values. In addition, s represents a Laplacian operator. A lateral acceleration Gystr estimated based upon the steering angle δ or a lateral acceleration Gyyaw estimated based upon the body yaw rate r of the yaw having been generated in the vehicle may be used as the lateral acceleration Gy, instead of the body lateral acceleration Gyact that has actually been generated.

In addition, a value obtained by combining Gxtgt1 and Gxtgt2 mentioned earlier may be designated as a target acceleration Gxtgt3.

Furthermore, lane hold control under which a yaw moment Mz is generated in the subject vehicle in order to prevent the subject vehicle from wandering out of the current lane based upon the positional relationship between the lane in which the subject vehicle is traveling and the subject vehicle, ascertained from the external information, may be executed as the yaw moment control.

Based upon the subject vehicle information and the external information, the braking/driving torque increase upper limit calculation unit 11 calculates the braking/driving torque increase upper limit value. While the external information is not strictly necessary in this calculation and the braking/driving torque increase upper limit value can be calculated based upon the subject vehicle information alone, a braking/driving torque increase upper limit value optimized for the current traveling situation can be set when external information is available. A calculation method that may be adopted in conjunction with the external information is described in reference to the first embodiment.

When it is determined, based upon the external information, that the longitudinal acceleration generated in the subject vehicle needs to be maximized, the maximum braking/driving torque increase that can be achieved with the wheel braking/driving torque actuator 3 is designated as the braking/driving torque increase upper limit, but otherwise, the braking/driving torque increase upper limit is set based upon the steerability assurance limit. For instance, if it is decided based upon the external information that a collision with an obstacle present ahead of the subject vehicle can be more effectively avoided through deceleration rather than through steering, the braking/driving torque increase upper limit is set so as to allow deceleration at the friction force limit. However, if it is decided that the collision can be more effectively avoided through steering, if the vehicle is being automatically decelerated in order to negotiate a curve present ahead or if the vehicle is currently operating under automatic acceleration/deceleration control so as to accelerate or decelerate in response to the steering operation described earlier, the braking/driving torque increase upper limit is set based upon the steerability assurance limit.

The braking/driving torque increase upper limit should be set based upon the steerability assurance limit by ensuring that the longitudinal force generated at each wheel does not exceed the longitudinal force upper limit set as the steerability assurance limit. While several methods may be adopted to estimate the longitudinal force upper limit to be designated as the steerability assurance limit, the longitudinal force upper limit is estimated in the first embodiment based upon a change in the longitudinal force (hereafter referred to as "slip stiffness (skid stiffness) Sstf" relative to the change in the slip ratio at each wheel.

Figure 12A:
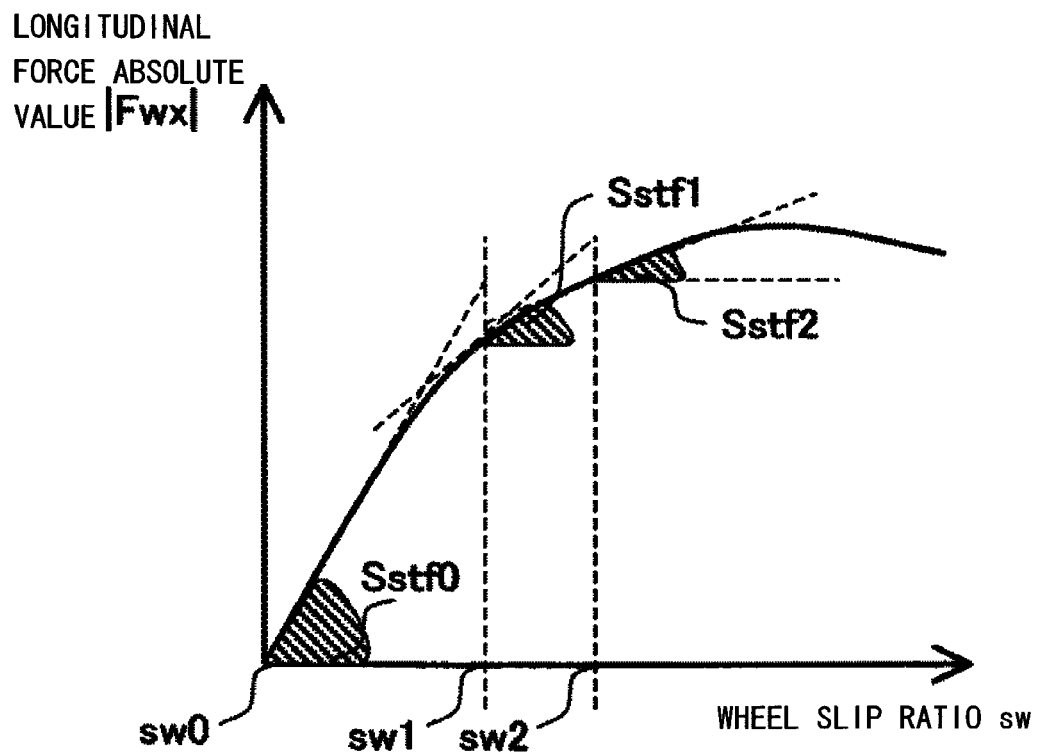
FIGS. 12A and 12B are conceptual diagrams indicating a relationship between the wheel slip ratio absolute value and the slip stiffness observed in the first embodiment of the present invention.
Figure 12B:
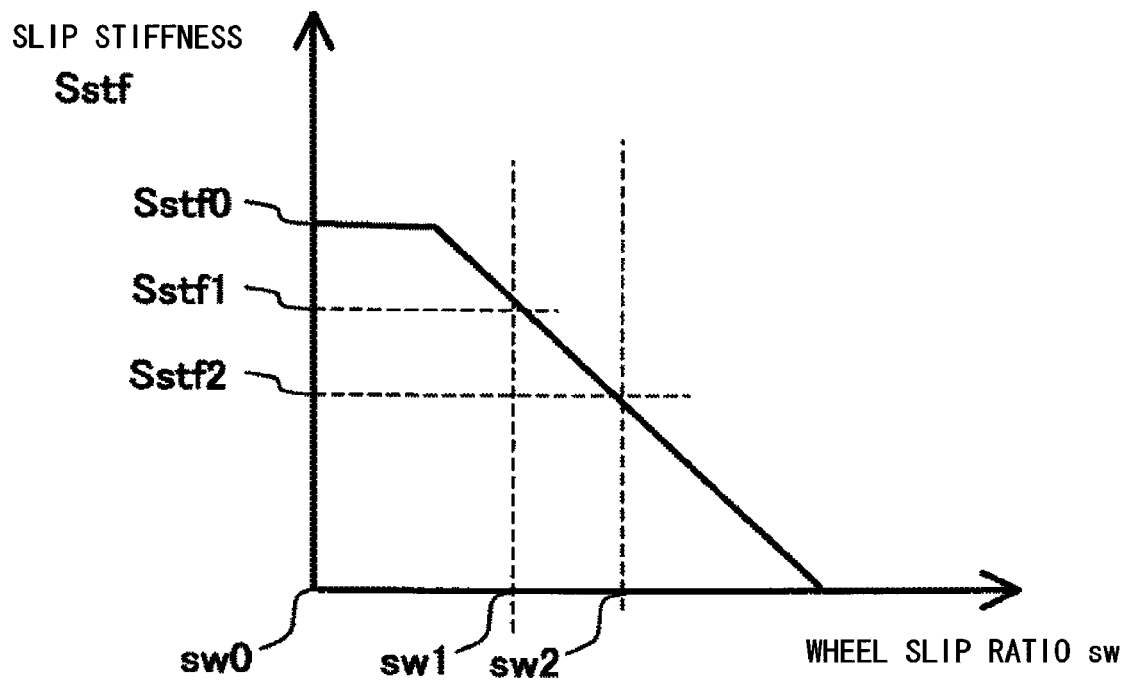
Figure 13A:
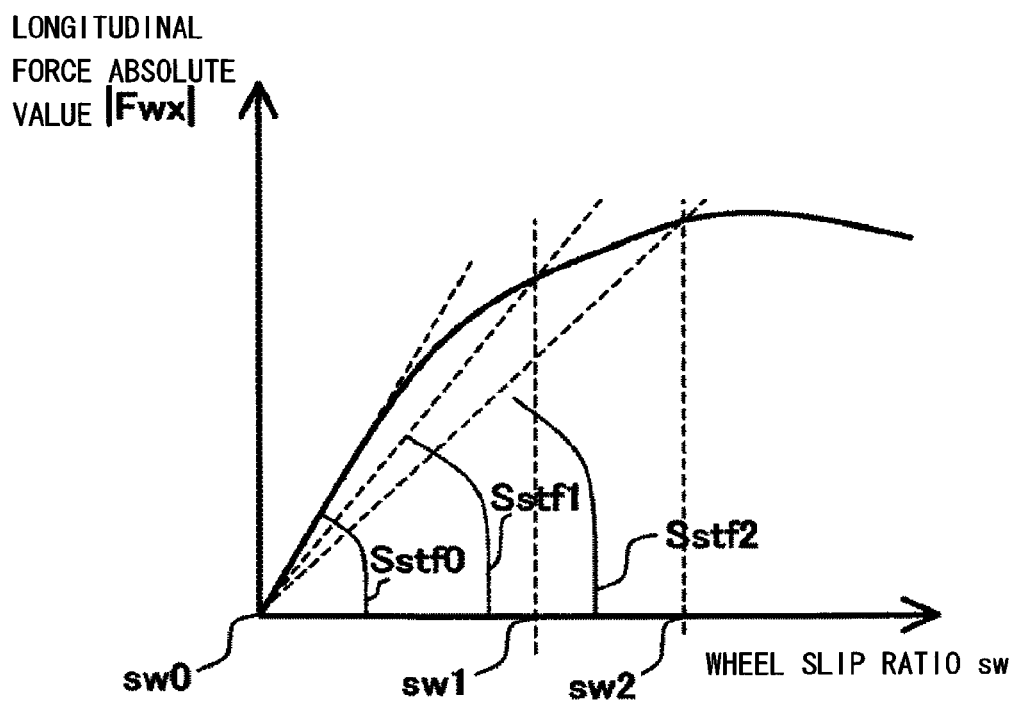
FIGS. 13A and 13B are conceptual diagrams indicating a relationship between the wheel slip ratio absolute value and the slip stiffness observed in the first embodiment of the present invention.
Figure 13B:
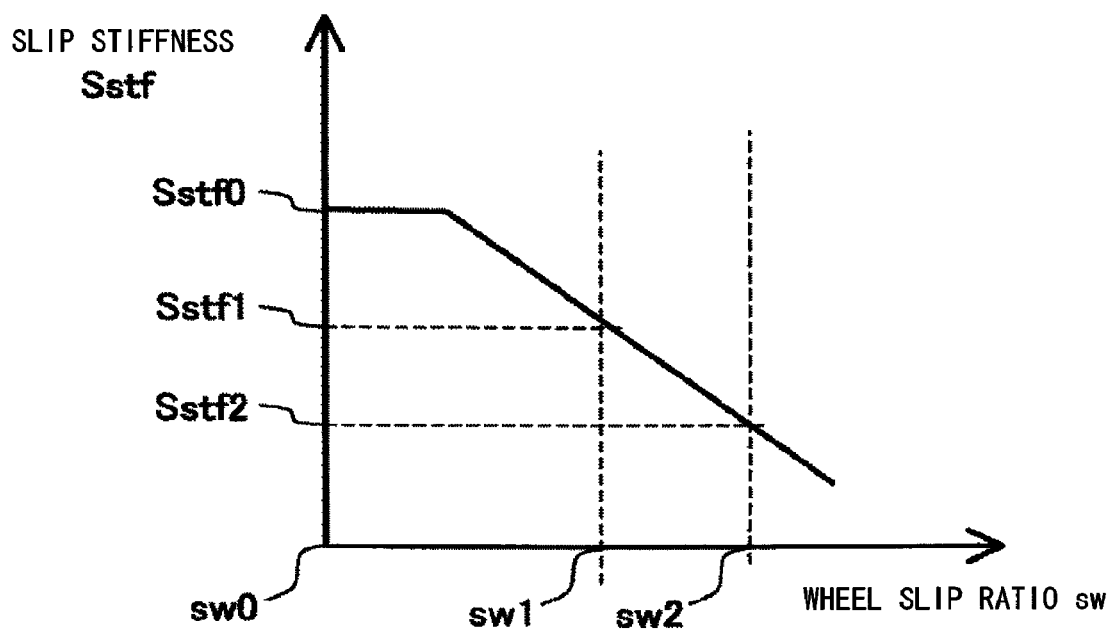

FIGS. 12A and 12B respectively indicate the relationship between the wheel slip ratio and the longitudinal force absolute value and the relationship between the wheel slip ratio and the slip stiffness.

As FIG. 12A indicates, the wheel slip ratio and the longitudinal force absolute value assume a substantially linear relationship to each other while the wheel slip ratio is low. However, as the wheel slip ratio increases, the longitudinal force absolute value starts to change nonlinearly relative to the wheel slip ratio. Thus, as the wheel slip ratio increases from sw0 to sw2 as shown in FIG. 12A, the slip stiffness Sstf changes as indicated in FIG. 12B. In other words, while the slip stiffness remains substantially constant while the wheel slip ratio is low, the slip stiffness starts to decrease as the wheel slip ratio increases. Namely, the value assumed for the slip stiffness Sstf becomes smaller as the degree of nonlinearity of the longitudinal force absolute value relative to the wheel slip ratio becomes higher. As FIGS. 7A and 7B mentioned earlier indicates, dFwy/dβw used as a steerability index tends to become smaller as the degree of nonlinearity of the longitudinal force absolute value increases. Accordingly, dFwy/dβw taking a value equal to or greater than a predetermined value can be assured by using the slip stiffness Sstf as a nonlinearity index and setting the longitudinal force upper limit so as to allow the slip stiffness Sstf to assume a value equal to or greater than a specific value.

In addition, if differential values, to be used as the slip stiffness index, cannot be calculated with ease at the various wheel slip ratios indicated in FIGS. 12A and 12B, a given slip stiffness Sstf0 may be set in correspondence to a wheel slip ratio of 0 and the slope of the straight line connecting the origin point and the point at which the wheel slip ratio and the longitudinal force absolute value intersect (e.g., P1 and P2 in FIG. 13A) may be set as the slip stiffness over the range in which the wheel slip ratio assumes positive values.

Figure 14A:
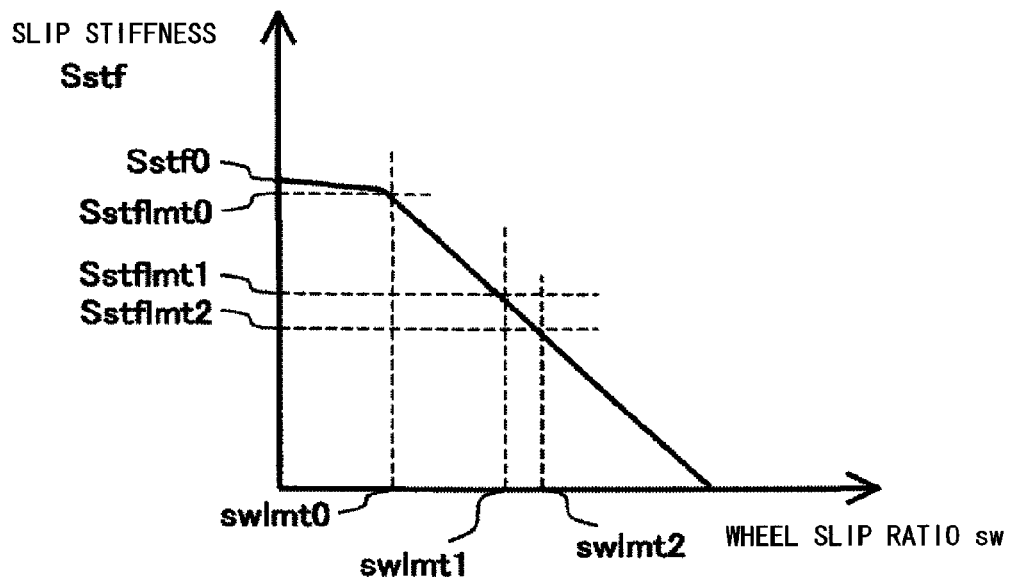
FIGS. 14A and 14B are conceptual diagrams indicating a relationship between the wheel slip ratio absolute value and the slip stiffness and a relationship between the wheel slip ratio absolute value and the braking/driving torque increase upper limit, as observed in the first embodiment of the present invention.
Figure 14B:
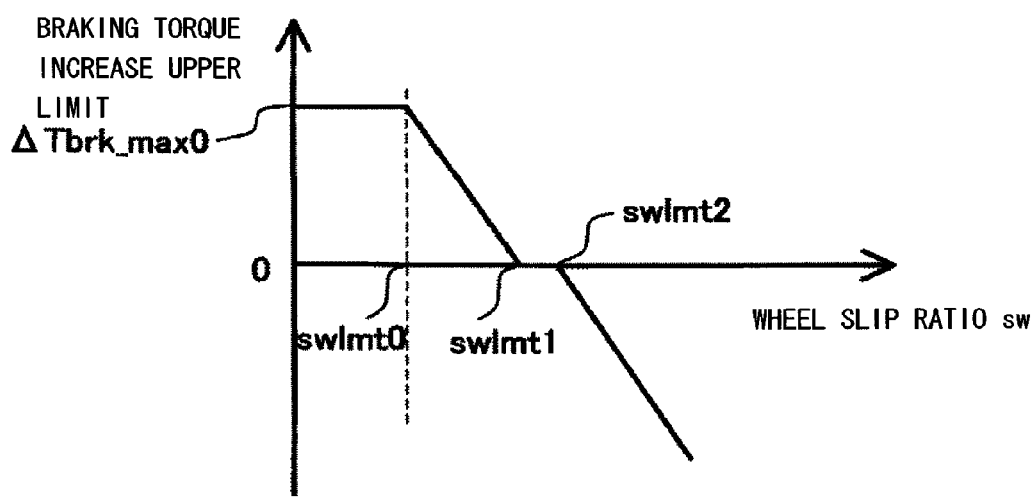

The braking/driving torque increase upper limit for each wheel is set so as to ensure that the slip stiffness value obtained as described above will not be lower than a predetermined value. FIGS. 14A and 14B show how an increase upper limit ΔTbrk_max for the braking torque Tbrk may be set. If the slip stiffness Sstf obtained as shown in FIGS. 12A and 12B or FIGS. 13A and 13B assumes a value less than a threshold value Sstflmt0 in FIG. 14A, the braking torque increase upper limit ΔTbrk_max assuming an initial value ΔTbrk_max0 in FIG. 14B is decreased as Sstf decreases and the braking torque increase upper limit is set to 0 over the range between a predetermined value Sstflmt1 and a predetermined value Sstflmt2. The predetermined values Sstflmt1 and Sstflmt2 are values preselected by taking into consideration the steerability assurance limit. Thus, as the braking torque increases triggering a decrease in the slip stiffness Sstf, the extent to which the braking torque increases is reduced and once the slip stiffness becomes less than the predetermined value Sstflmt1, the braking torque no longer increases, thereby making it possible to control the braking torque so as to sustain the slip stiffness Sstf at a level equal to or greater than Sstflmt2. In addition, even if Sstf falls below Sstflmt2, the braking torque can be reduced by assuming a negative value for the braking torque increase upper limit ΔTbrk_max and thus, the slip stiffness Sstf can be adjusted to a greater value.

While an explanation is given above on the control for the braking torque, an increase upper limit ΔTdrv_max for the driving torque Tdrv can be set in a similar manner. Also, while the braking torque increase upper limit value is decreased linearly in correspondence to the decrease in the slip stiffness Sstf in the example presented in FIGS. 14A and 14B, the braking torque increase upper limit may be set relative to the slip stiffness Sstf through a method other than that shown in FIGS. 14A and 14B, as long as the braking torque increase upper limit is set so as to ensure that the slip stiffness Sstf does not assume a value less than a given predetermined value Sstflmt2. Through these measures, the braking/driving torque increase upper limit can be set by factoring in the steerability assurance limit.

In addition, different values may be assumed in correspondence to the friction force limit for Sstflmt0, Sstflmt1 and Sstflmt2 in FIG. 14A and for the braking torque increase upper limit relative to the slip stiffness Sstf in FIG. 14B. For instance, when the friction force limit is low, greater values may be assumed for Sstflmt1 and Sstflmt2 than the values that would be assumed when the friction force limit is higher. Methods that may be adopted to detect or estimate the friction force limit include that through which the friction force limit is estimated based upon the longitudinal force absolute value determined relative to the slip stiffness Sstf.

When determining through arithmetic operation the slip stiffness as described above, the longitudinal force absolute value indicating the longitudinal force generated at each wheel needs to be detected or estimated.

The longitudinal force at each wheel may be detected based upon the strain manifesting at a wheel portion or based upon the strain or the like occurring at a wheel bearing. As an alternative, the longitudinal force may be estimated by using a highly accurate tire model. Furthermore, instead of estimating or detecting the longitudinal force by using a complicated tire model or by using an expensive sensor or the like for longitudinal force detection, the slip stiffness may be determined through arithmetic operation executed based upon the longitudinal acceleration and the wheel slip ratio corresponding to each wheel and, in such a case, the slip stiffness can be calculated with ease by taking full advantage of the structural features of vehicles in mass production. For instance, the slip stiffness (hereafter referred to as body slip stiffness VSstf) for the entire body regarded as an integrated wheel may be calculated as below based upon the wheel slip ratios Sw[wheel] corresponding to the individual wheels and the longitudinal acceleration Gxact generated in the body.

[Expression 6]

$$VSstf = \frac{M \cdot |G_{xact}| \cdot \{1 - kw \cdot (H/L_{wheelbase}) \cdot (Sw[FL] + Sw[FR] - Sw[RL] - Sw[RR])\}}{(Sw[FL] + Sw[FR] + Sw[RL] + Sw[RR])} \quad (6)$$

M, kw, h and Lwheelbase in the expression above respectively represent the vehicle mass, the longitudinal force load dependency coefficient, the gravitational center height and the wheelbase length, all assuming predetermined values. In addition, Gxact represents the body longitudinal acceleration that takes positive values along the vehicle advancing direction and the wheel slip ratios Sw[wheel] each assume a value calculated in correspondence to the body velocity V and the wheel velocity Vw[wheel] at the corresponding wheel.

The braking/driving torque upper limit value can be set in a manner similar to that shown in FIGS. 14A and 14B by imposing several restrictions on the vehicle slip stiffness VSstf calculated as expressed in (6) above. For instance, when controlling the braking/driving torques at four wheels, matching braking/driving torque values may be set for the left and right front wheels, matching braking/driving torque values may be set for the left and right rear wheels, the braking/driving torque increase upper limit may be set for the pair of front wheels or the pair of rear wheels with a greater wheel slip ratio by ensuring that the VSstf does not take a value less than a predetermined value, and the braking/driving torque increase upper limit may be set in correspondence to the other pair of wheels by ensuring that the corresponding wheel slip ratio never exceeds the wheel slip ratio of the first pair, so as to set the braking/driving torque upper limit by taking into consideration the steerability assurance limit. In addition, the friction force limit, too, can be estimated through a similar method based upon the vehicle slip stiffness VSstf and the absolute value of the acceleration generated in the vehicle.

The automatic braking/driving torque command value calculation unit 12 calculates automatic braking/driving torque command values based upon the target acceleration or the target yaw moment or both the target acceleration and the target yaw moment, calculated by the target acceleration·target yaw moment calculation unit 10, and the braking/driving torque increase upper limits calculated by the braking/driving torque increase upper limit calculation unit 11.

With Tbrk_Vreq0[wheel] representing the initial value of the automatic braking torque that needs to be generated at a given wheel in order to generate the target acceleration or the target yaw moment or both the target acceleration and the target yaw moment having been calculated by the target acceleration·target yaw moment calculation unit 10, the automatic braking torque command value Tbrk_Vreq[wheel] can be calculated as expressed below based upon the braking torque increase upper limit ΔTbrk_max[wheel] having been calculated by the braking/driving torque increase upper limit calculation unit 11.

[Expression 7]

$$Tbrk\_vreq[wheel] = Tbrk\_vreq\_z1[wheel] + \min(\Delta Tbrk\_\max[wheel], Tbrk\_vreq0[wheel] - Tbrk\_vreq\_z1[wheel]) \quad (7)$$

Tbrk_Vreq_z1[wheel] indicates the previous value most recently assumed for Tbrk_Vreq[wheel], whereas min(A, B) represents a function whereby either A or B, whichever is smaller, is selected.

For instance, when a target acceleration −Gxtgt1 has been calculated by the target acceleration·target yaw moment calculation unit 10 and a braking torque increase upper limit ΔTbrk_maxf and a braking torque increase upper limit ΔTbrk_maxr have been calculated respectively for the pair of front wheels and the pair of rear wheels by the braking/driving torque increase upper limit calculation unit 11, the automatic braking torque command value Tbrk_Vreqf for the front wheels and the automatic braking torque command value Tbrk_Vreqr for the rear wheels can be calculated as expressed below.

[Expression 8]

$$Tbrk\_vreqf = Tbrk\_vreqf\_z1 + \min(\Delta Tbrk\_\max f, CFtrqf \cdot \alpha Gf \cdot M \cdot |Gxtgt1|/2 - Tbrk\_vreqf\_z1) \quad (8)$$

[Expression 9]

$$Tbrk\_vreqr = Tbrk\_vreqr\_z1 + \min(\Delta Tbrk\_\max r, CFtrqr \cdot (1 - \alpha Gf) \cdot M \cdot |Gxtgt1|/2 - Tbrk\_vreqr\_z1) \quad (9)$$

CFtrqf represents a braking torque-braking force conversion coefficient for the front wheels, CFtrqr represents a braking torque-braking force conversion coefficient for the rear wheels, αGf represents the braking force distribution ratio (0≤αGf≤1) with which the braking force is to be distributed to the front and rear wheels under longitudinal acceleration control, Tbrk_Vreqf_z1 represents the previous braking torque value for the front wheels and Tbrk_Vreqr_z1 represents the previous braking torque value for the rear wheels. αf may be a preselected fixed value or it may be a variable that is adjusted in proportion to the friction force limit at each wheel.

In addition, if a left turn yaw moment value Mztgt1 has been calculated for a target yaw moment by the target acceleration·target yaw moment calculation unit 10 and a braking torque increase upper limit ΔTbrk_max[FL] and a braking torque increase upper limit ΔTbrk_max[RL] have been calculated respectively for the front left wheel and the rear left wheel by the braking/driving torque increase upper limit calculation unit 11, the braking torque command value Tbrk_Vreq[FL] for the front wheel and the braking torque command value Tbrk_Vreq[RL] for the rear wheel can be calculated as expressed below.

[Expression 10]

$$Tbrk\_vreq[FL] = Tbrk\_vreq\_z1[FL] + \min(\Delta Tbrk\_\max[FL]j, CMtrqf \cdot \alpha Mf \cdot M \cdot |Mztgt1| - Tbrk\_vreq\_z1[FL]) \quad (10)$$

[Expression 11]

$$Tbrk\_vreq[RL] = Tbrk\_vreq\_z1[RL] + \min(\Delta Tbrk\_\max[RL], CMtrqr \cdot (1 - \alpha Mf) \cdot M \cdot |Mztgt1| - Tbrk\_vreq\_z1[RL]) \quad (11)$$

CMtrqf represents a braking torque-yaw moment conversion coefficient for the front wheel, CMtrqr represents a braking torque-yaw moment conversion coefficient for the rear wheel, and αMf represents the braking force distribution ratio (0≤αMf≤1) with which the braking force is to be distributed to the front and rear wheels under yaw moment control. αMf may be a preselected fixed value or it may be a variable that is adjusted in proportion to the friction force limit at each wheel in correspondence to the yaw moment to be generated.

The target braking/driving torque calculation unit 8 determines through arithmetic operation the ultimate target braking/driving torque based upon the driver-requested braking/driving torque having been provided by the driver-requested braking/driving torque calculation unit 6 and the automatic braking/driving torque command value provided from the automatic braking/driving torque control calculation unit 7.

The target braking/driving torque may be calculated through addition/subtraction of the driver-requested braking/driving torque and the automatic braking/driving torque command value or it may be calculated by first applying specific weighting coefficients to the driver-requested braking/driving torque and the automatic braking/driving torque command value and then adding/subtracting the weighted driver-requested braking/driving torque and automatic braking/driving torque command value. As long as the driver-requested braking/driving torque and the automatic braking/driving torque command value indicate an operation along one direction (braking or driving), the target braking/driving torque may be set by selecting the greater value or by combining the methods described above. For instance, if a driver-requested driving torque Tdrv_Vreq[wheel] has been calculated by the driver-requested braking/driving torque calculation unit 6 and an automatic braking torque command value Tbrk_Vreq[wheel] has been calculated by the automatic braking/driving torque control calculation unit 7, the ultimate target braking/driving torque Tw_tgt[wheel] may be calculated as expressed below. While the target braking/driving torque Tw_tgt[wheel] assuming a positive value represents a driving torque, the target braking/driving torque Tw_tgt[wheel] assuming a negative value represents a braking torque.

[Expression 12]

$$Tw\_tgt[\text{wheel}] = Wd \cdot Tdrv\_dreq[\text{wheel}] - Wv \cdot Tbrk\_vreq[\text{wheel}] \quad (12)$$

Wd and Wv in the expression provided above respectively represent a weighting coefficient applied to the driver-requested braking/driving torque and a weighting coefficient applied to the automatic braking/driving torque command value. Wd and Wv may be preselected values or the Wd and Wv values may be adjusted based upon the external information and the like. For instance, if a driver-requested driving torque Tdrv_Vreq[wheel] has been calculated even though there is a high risk of a collision with an obstacle present ahead of the subject vehicle, priority is given to the automatic braking torque command value Tbrk_Vreq[wheel] by setting Wd to a very small value. Through these measures, the subject vehicle can be slowed as needed even if the driver steps on the accelerator pedal in spite of the high risk of collision with an obstacle present ahead of the vehicle. In addition, the ultimate target braking/driving torque Tw_tgt[wheel] may be calculated as expressed below based upon a driver-requested braking torque Tbrk_dreq[wheel] calculated by the driver-requested braking/driving torque calculation unit 6 and an automatic braking torque command value Tbtbrk_vreq[wheel] calculated by the automatic braking/driving torque control calculation unit 7.

[Expression 13]

$$Tw\_tgt[\text{wheel}] = -(Wd \cdot Tbrk\_dreq[\text{wheel}] + Wv \cdot Tbrk\_vreq[\text{wheel}]) \quad (13)$$

Through these measures, the rate of deceleration can be increased in correspondence to Tbrk_dreq[wheel] if the driver of the vehicle undergoing automatic deceleration feels that the subject vehicle is not decelerating fast enough.

The actuator drive command value calculation unit 9 calculates a drive control command value for the relevant actuator in correspondence to the target braking/driving torque Tw_tgt[wheel]. If, for instance, the wheel braking/driving torque actuator is a motor, it calculates a drive command value for the motor so that it generates the target braking/driving torque Tw_tgt[wheel]. In addition, if the target braking/driving torque Tw_tgt[wheel] assumes a negative value, i.e., if a braking torque is to be generated, a brake lamp drive command is generated through arithmetic operation so as to turn on the brake lamps in correspondence to the deceleration to be achieved. For instance, if the rate of deceleration to be achieved is very low, the brake lamp may remain unlit, and the brake lamp may be turned on only when a deceleration equal to or greater than a predetermined value is to be generated.

The embodiment described above assures the desired level of steerability during automatic braking/driving torque control while disallowing any excessive decrease in the absolute value of the acceleration generated in the vehicle by executing braking/driving torque control based upon the steerability assurance limit set as the upper limit value in addition to the wheel braking/driving torque control of the related art executed based entirely upon the friction force limit.

While the braking/driving torque increase upper limit is set based upon the slip stiffness in the embodiment described above, a handling assurance limit assuming a smaller value than the friction force limit value may be set and a braking/driving torque may be set for each wheel based upon the handling assurance limit instead, as long as the limit to the friction force that can be generated at the vehicle can be detected or estimated with a high level of accuracy. When such a method is adopted, a handling assurance limit value corresponding to the friction force limit must be set in advance.

In addition, the braking/driving torque for each wheel may be set based upon the acceleration generated at the vehicle. For instance, as long as the acceleration friction force limit can be detected or estimated with a high level of accuracy, a handling assurance acceleration limit assuming a smaller value than the acceleration friction force limit may be set, as shown in FIG. 15, and the braking/driving torque for each wheel may be set based upon the handling assurance acceleration limit thus set. When such a method is adopted, a handling assurance acceleration limit value corresponding to the friction force acceleration limit must be set in advance.

(Second Embodiment)

Figure 16:
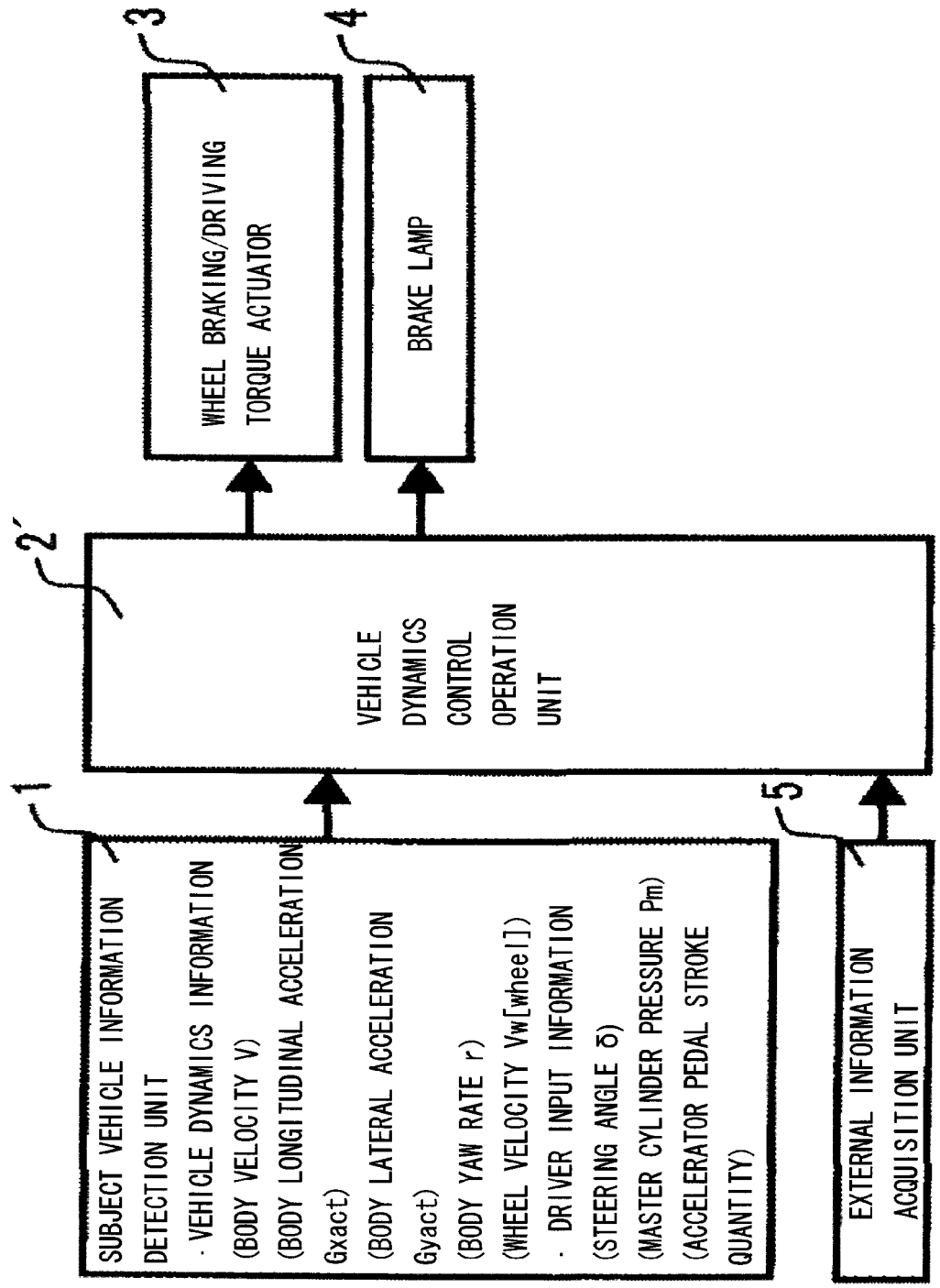
FIG. 16 is a system block diagram showing the structure adopted in the vehicle dynamics control device achieved in a second embodiment of the present invention.
Figure 17:
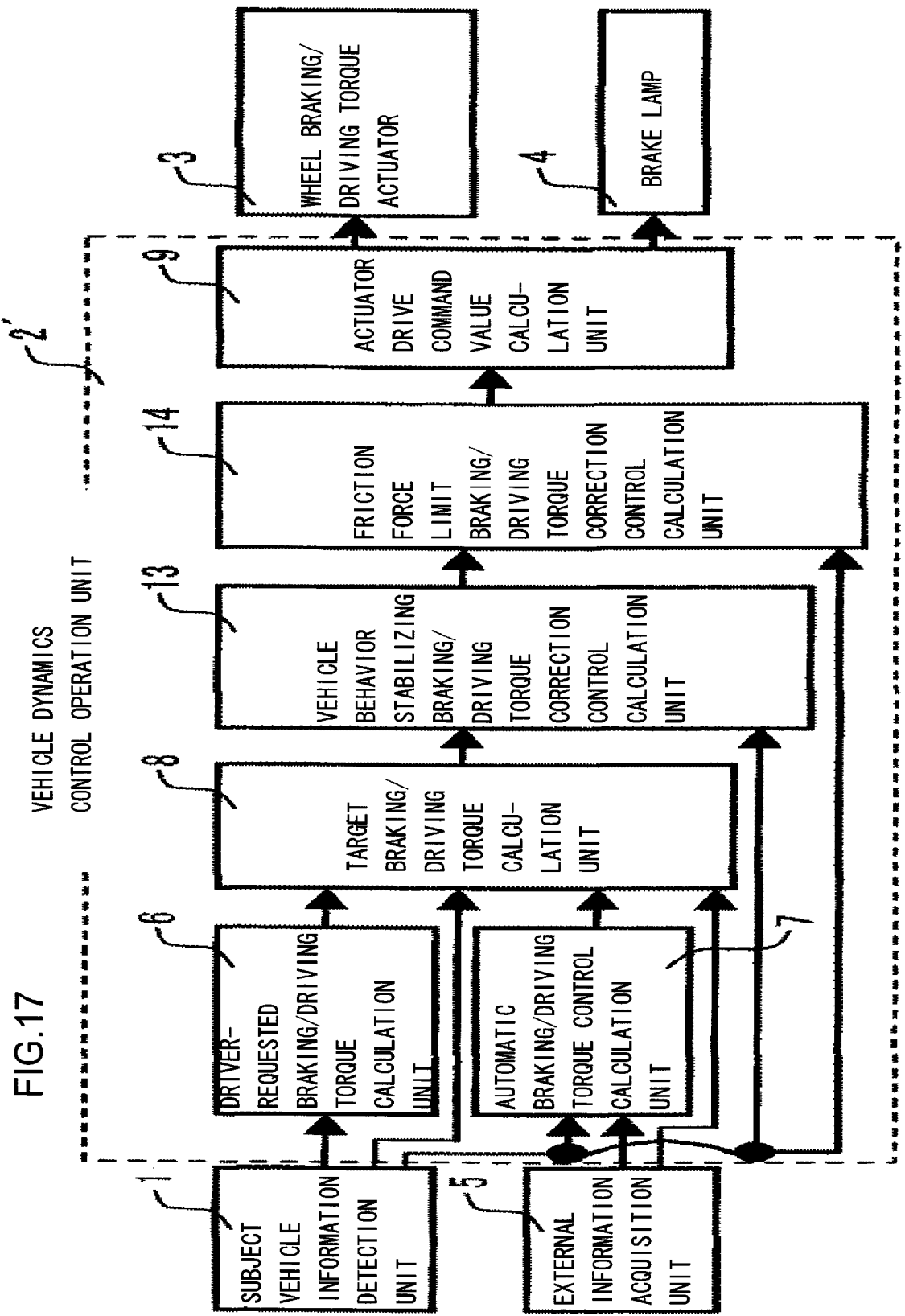
FIG. 17 is a system block diagram showing the structure adopted in the vehicle dynamics control unit achieved in the second embodiment of the present invention.

In reference to FIGS. 16 and 17, the structure adopted in the vehicle dynamics control device achieved in the second embodiment of the present invention and the operation executed therein are described.

First, in reference to FIG. 16, the structure adopted in the vehicle dynamics control device in the second embodiment of the present invention is described.

FIG. 16 is a system block diagram showing the structure of the vehicle dynamics control device achieved in the second embodiment of the present invention.

The vehicle dynamics control device achieved in the embodiment, which is installed in a vehicle, includes a subject vehicle information detection unit 1 that obtains information indicating subject vehicle dynamics conditions and an operation quantity representing the extent to which the subject vehicle is operated by the driver, a vehicle dynamics control operation unit 2' that provides control commands to braking/driving force actuators and the like, a wheel braking/driving torque actuator 3 that generates a braking/driving torque at the wheels based upon a command provided from the vehicle dynamics control operation unit 2', a brake lamp 4 that indicates to following vehicles that the subject vehicle is decelerating and an external information acquisition unit 5.

Since the subject vehicle information detection unit 1, the wheel braking/driving torque actuator 3, the brake lamps 4, and the external information acquisition unit 5 are identical to those described earlier in reference to the first embodiment, a repeated explanation is not provided. The following explanation focuses on the method adopted in the vehicle dynamics control operation unit 2' when generating through arithmetic operation, control commands for the wheel braking/driving torque actuator.

FIG. 17 presents a control block diagram pertaining to the control achieved via the vehicle dynamics control operation unit 2' in the second embodiment of the present invention.

As shown in FIG. 17, the vehicle dynamics control operation unit 2' includes a driver-requested braking/driving torque calculation unit 6, an automatic braking/driving torque control calculation unit 7, a target braking/driving torque calculation unit 8, an actuator drive command value calculation unit 9, a vehicle behavior stabilizing braking/driving torque correction control calculation unit 13 and a friction force limit braking/driving torque correction control calculation unit 14.

Since the driver-requested braking/driving torque calculation unit 6, the automatic braking/driving torque control calculation unit 7, the target braking/driving torque calculation unit 8 and the actuator drive command value calculation unit 9 are similar to those described in reference to the first embodiment, a repeated explanation is not provided.

The vehicle behavior stabilizing braking/driving torque correction control calculation unit 13 calculates a yaw moment Mzreq or a body acceleration Gxreq required to stabilize the vehicle behavior or both the yaw moment Mzreq and the body acceleration Gxreq based upon the subject vehicle information provided via the subject vehicle information detection unit 1. It then calculates a vehicle behavior stabilizing correction target braking/driving torque by correcting, based upon Mzreq and Gxreq, the target braking/driving torque calculated for each wheel by the target braking/driving torque calculation unit 8.

For instance, if a vehicle spin-out tendency is detected based upon the yaw rate r generated in the vehicle, the lateral acceleration Gyact generated in the vehicle and the steering angle δ, the target braking/driving torque is corrected so as to generate a yaw moment along the direction in which the spin-out tendency is inhibited. Likewise, if a vehicle drift out tendency is detected, the target braking/driving torque is corrected so as to generate a yaw moment and deceleration that will inhibit the tendency to drift.

The friction force limit braking/driving torque correction control calculation unit 14 detects a locking tendency or a wheel-spin tendency that may manifest at each wheel based upon the subject vehicle information provided via the subject vehicle information detection unit 1 and calculates a friction force limit correction target braking/driving torque by correcting the vehicle behavior stabilizing correction target braking/driving torque having been calculated by the vehicle behavior stabilizing braking/driving torque correction control calculation unit 10.

As described above, in addition to the control for adjusting the absolute value of the longitudinal force generated at each wheel to a level equal to or less than the steerability assurance limit shown in FIG. 8, achieved via the braking/driving torque increase upper limit calculation unit 11, control is also executed via the vehicle behavior stabilizing braking/driving torque correction control calculation unit 13 and the friction force limit braking/driving torque correction control calculation unit 14. Thus, stabilizing control is enabled whenever the vehicle behavior becomes unstable and braking/driving torque control at the friction force limit is enabled, in addition to the braking/driving torque control executed to assure the required level of maneuverability during regular operation. As a result, if the driver of the vehicle under automatic braking torque control executed based upon the steerability assurance limit wishes to generate a braking torque equal to or greater than the automatic braking torque, the higher braking torque can be generated within the friction force limit without inducing a wheel lock.

(Third Embodiment)

Figure 18:
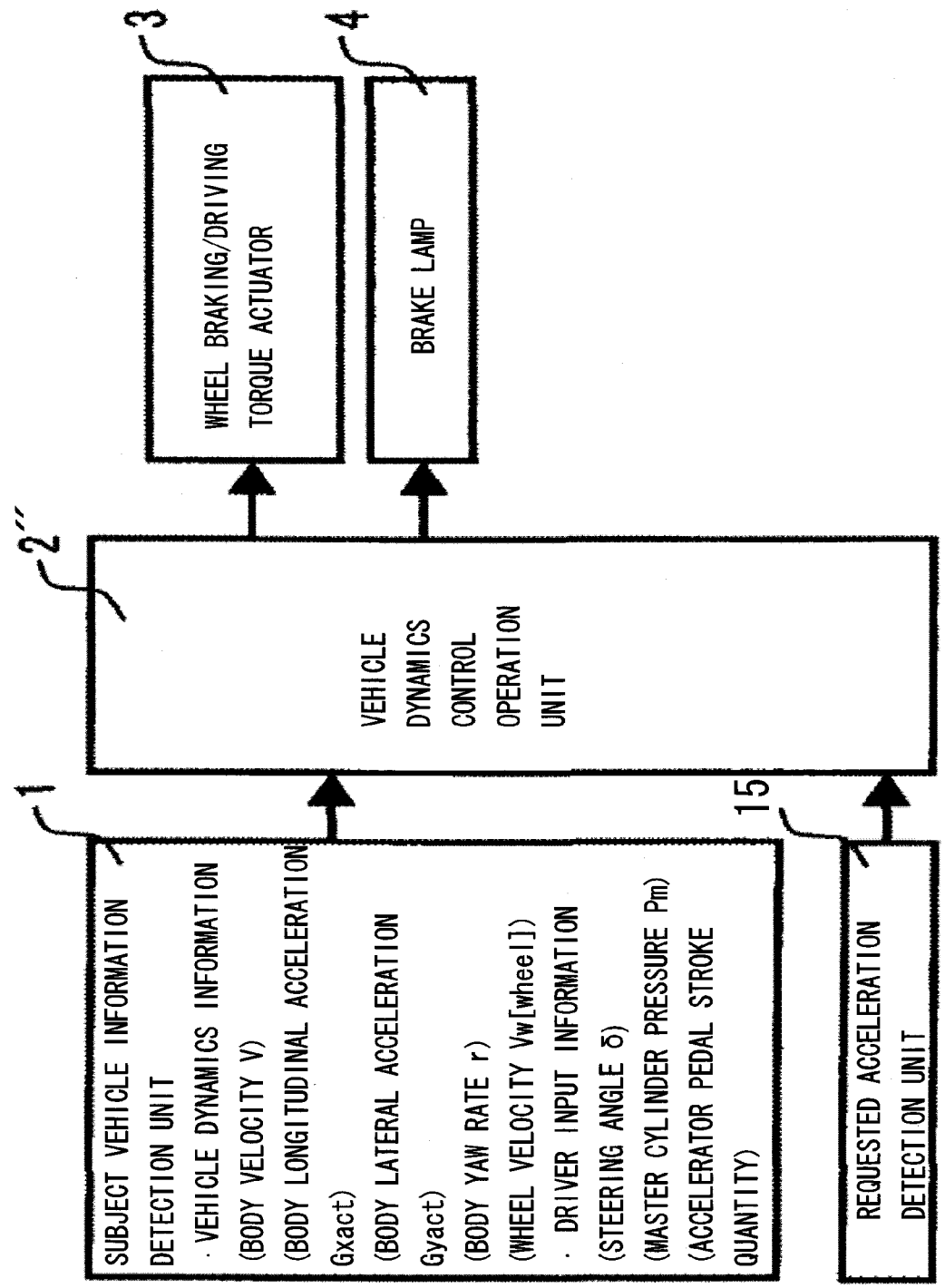
FIG. 18 is a system block diagram showing the structure adopted in the vehicle dynamics control device achieved in a third embodiment of the present invention.
Figure 19:
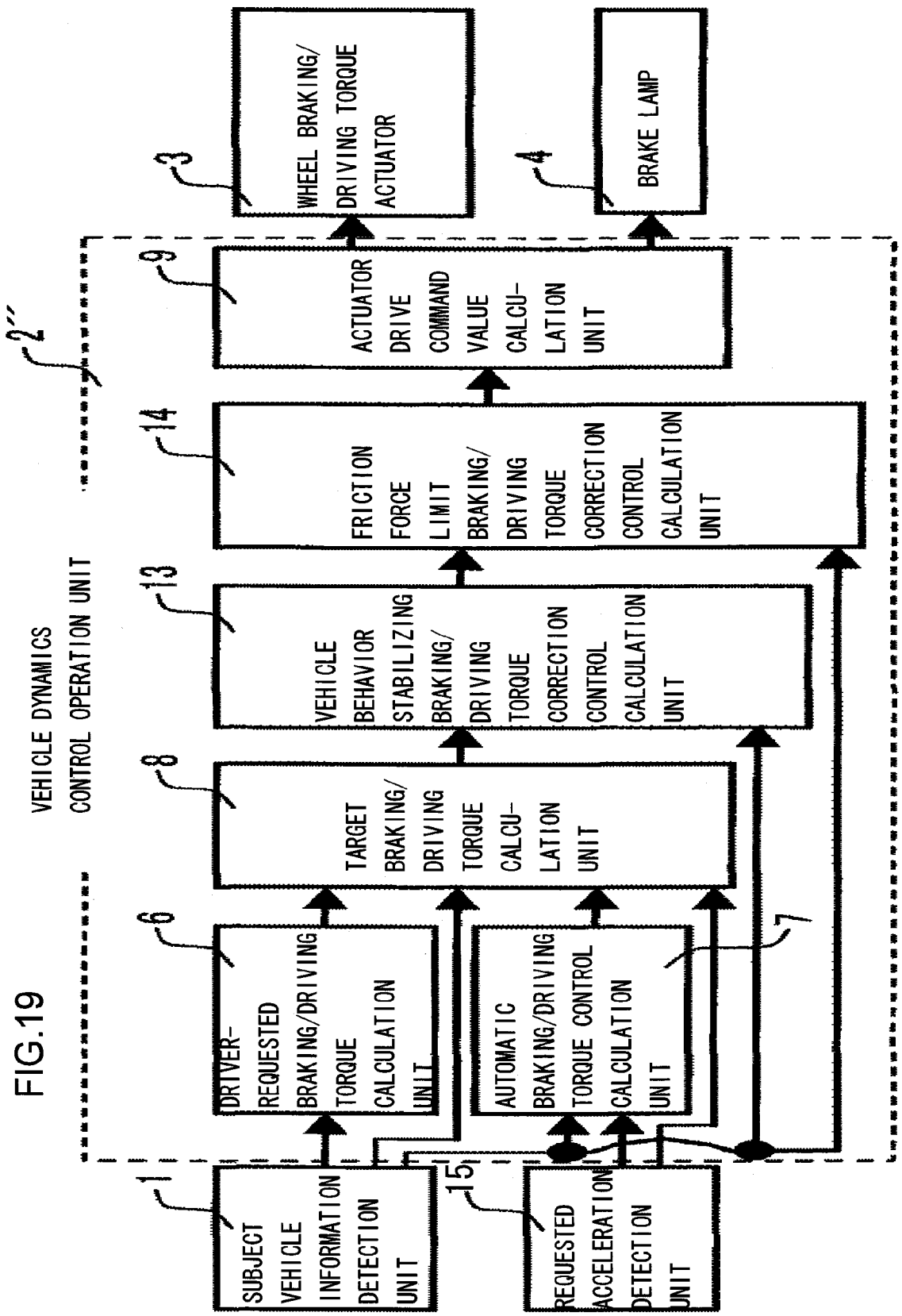
FIG. 19 is a system block diagram showing the structure adopted in the vehicle dynamics control unit achieved in the third embodiment of the present invention.
Figure 20:
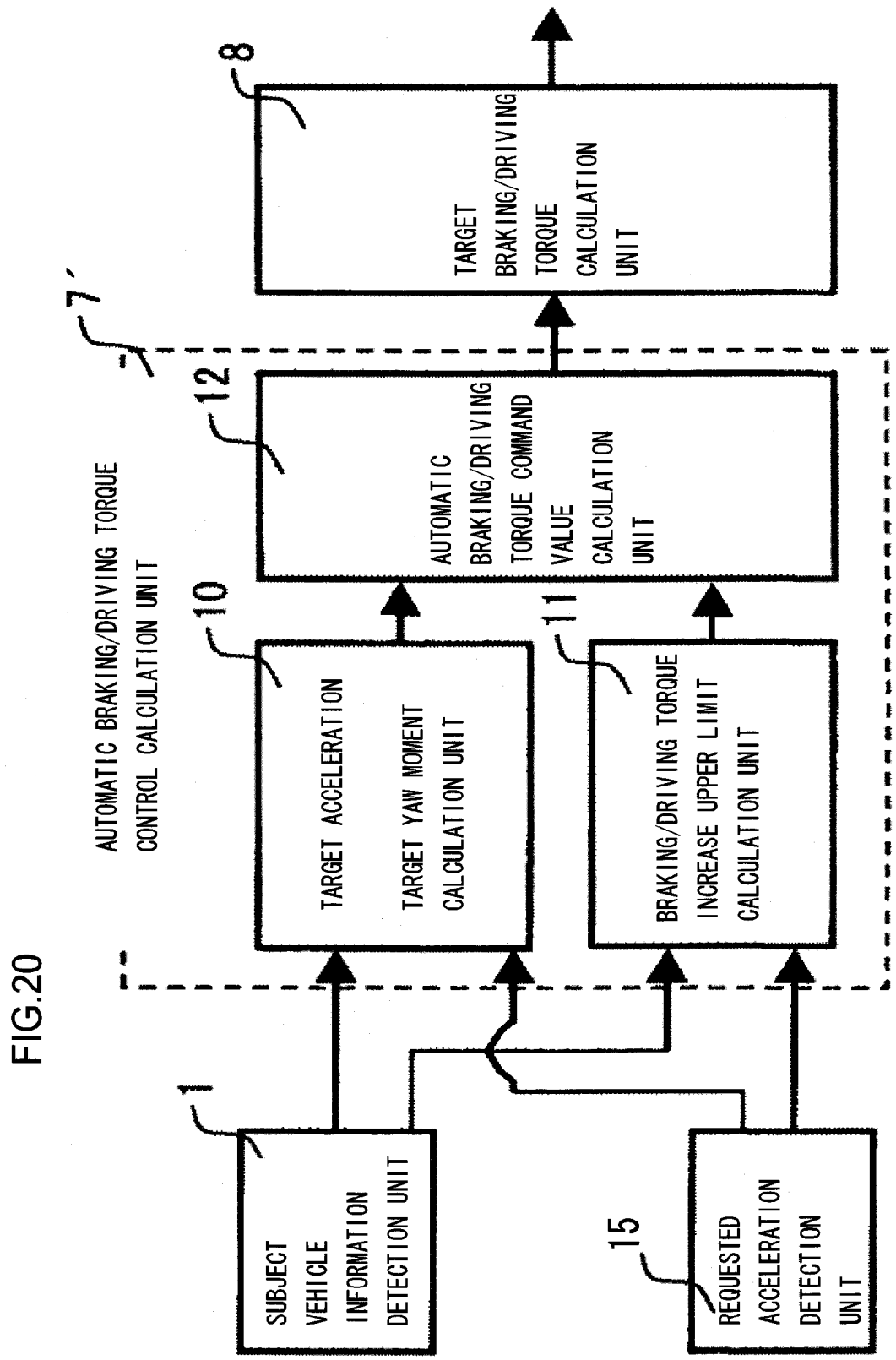
FIG. 20 is a system block diagram showing the structure adopted to enable automatic braking/driving torque control operation in the third embodiment of the present invention.

In reference to FIGS. 18 through 20, the structure of the vehicle dynamics control device achieved in the third embodiment of the present invention and the operation executed therein are described.

First, in reference to FIG. 18, the structure adopted in the vehicle dynamics control device in the third embodiment of the present invention is described.

FIG. 18 is a system block diagram showing the structure of the vehicle dynamics control device achieved in the third embodiment of the present invention.

The vehicle dynamics control device achieved in the embodiment, which is installed in a vehicle, includes a subject vehicle information detection unit 1 that obtains information indicating a subject vehicle dynamics conditions and an operation quantity representing the extent to which the subject vehicle is operated by the driver, a vehicle dynamics control operation unit 2" that provides control commands to braking/driving force actuators and the like, a wheel braking/driving torque actuator 3 that generates a braking/driving torque at the wheels based upon a command provided from the vehicle dynamics control operation unit 2", a brake lamp 4 that indicates to following vehicles that the subject vehicle is decelerating and a requested acceleration detection unit 15.

Since the subject vehicle information detection unit 1, the wheel braking/driving torque actuator 3 and the brake lamps 4 are identical to those described earlier in reference to the first embodiment, a repeated explanation is not provided. The following explanation focuses on the method adopted in the requested acceleration detection unit 15 and the vehicle dynamics control operation unit 2" when generating through arithmetic operation, control commands for the wheel braking/driving torque actuator.

The requested acceleration detection unit 15 is a means for detecting an acceleration request by the driver. For instance, the requested acceleration may be detected based upon the extent to which a joystick mounted at the steering wheel has been operated or the requested acceleration may be detected based upon the extent to which a lever mounted at the steering wheel has been operated.

FIG. 19 presents a control block diagram pertaining to the control achieved via the vehicle dynamics control operation unit 2" in the third embodiment of the present invention.

As shown in FIG. 19, the vehicle dynamics control operation unit 2" includes a driver-requested braking/driving torque calculation unit 6, an automatic braking/driving torque control calculation unit 7', a target braking/driving torque calculation unit 8, an actuator drive command value calculation unit 9, a vehicle behavior stabilizing braking/driving torque correction control calculation unit 13 and a friction force limit braking/driving torque correction control calculation unit 14.

Since the driver-requested braking/driving torque calculation unit 6, the target braking/driving torque calculation unit 8, the actuator drive command value calculation unit 9, the vehicle behavior stabilizing braking/driving torque correction control calculation unit 13 and the friction force limit braking/driving torque correction control calculation unit 14 are similar to those described in reference to the second embodiment, a repeated explanation is not provided.

The automatic braking/driving torque control calculation unit 7' calculates an automatic braking/driving torque command value based upon the subject vehicle information provided via the subject vehicle information detection unit 1 and the requested acceleration provided via the requested acceleration detection unit 15.

As shown in FIG. 20, the automatic braking/driving torque control calculation unit 7' includes a target acceleration·target yaw moment calculation unit 10, a braking/driving torque increase upper limit calculation unit 11 and an automatic braking/driving torque command value calculation unit 12.

While the calculation methods adopted in the target acceleration·target yaw moment calculation unit 10, the braking/driving torque increase upper limit calculation unit 11 and the automatic braking/driving torque command value calculation unit 12 are substantially similar to those described in reference to the first embodiment, the control achieved via the automatic braking/driving torque control calculation unit 7' differs from that in the first embodiment in that the requested acceleration provided via the requested acceleration detection unit 15 is used in place of the acceleration calculated based upon the external information in the first embodiment.

As described above, as the automatic braking/driving torque control calculation unit 7' executes arithmetic operation based upon the requested acceleration provided via the requested acceleration detection unit 15, braking/driving torque control, which refers to the braking/driving torque upper limit generated via the requested acceleration detection unit 15 as the handling assurance limit value is enabled. As a result, better operational versatility is afforded to the driver. For instance, if the driver wishes to drive the vehicle under acceleration control executed by setting the handling assurance limit as the upper limit, the driver is able to start such acceleration control by providing an operation input to the requested acceleration detection unit 15, whereas if the driver wishes to drive the vehicle under acceleration control executed by setting the friction force limit as the upper limit value, he is able to start such acceleration control by providing an operation input via the brake pedal or the accelerator pedal.

(Fourth Embodiment)

Figure 21:
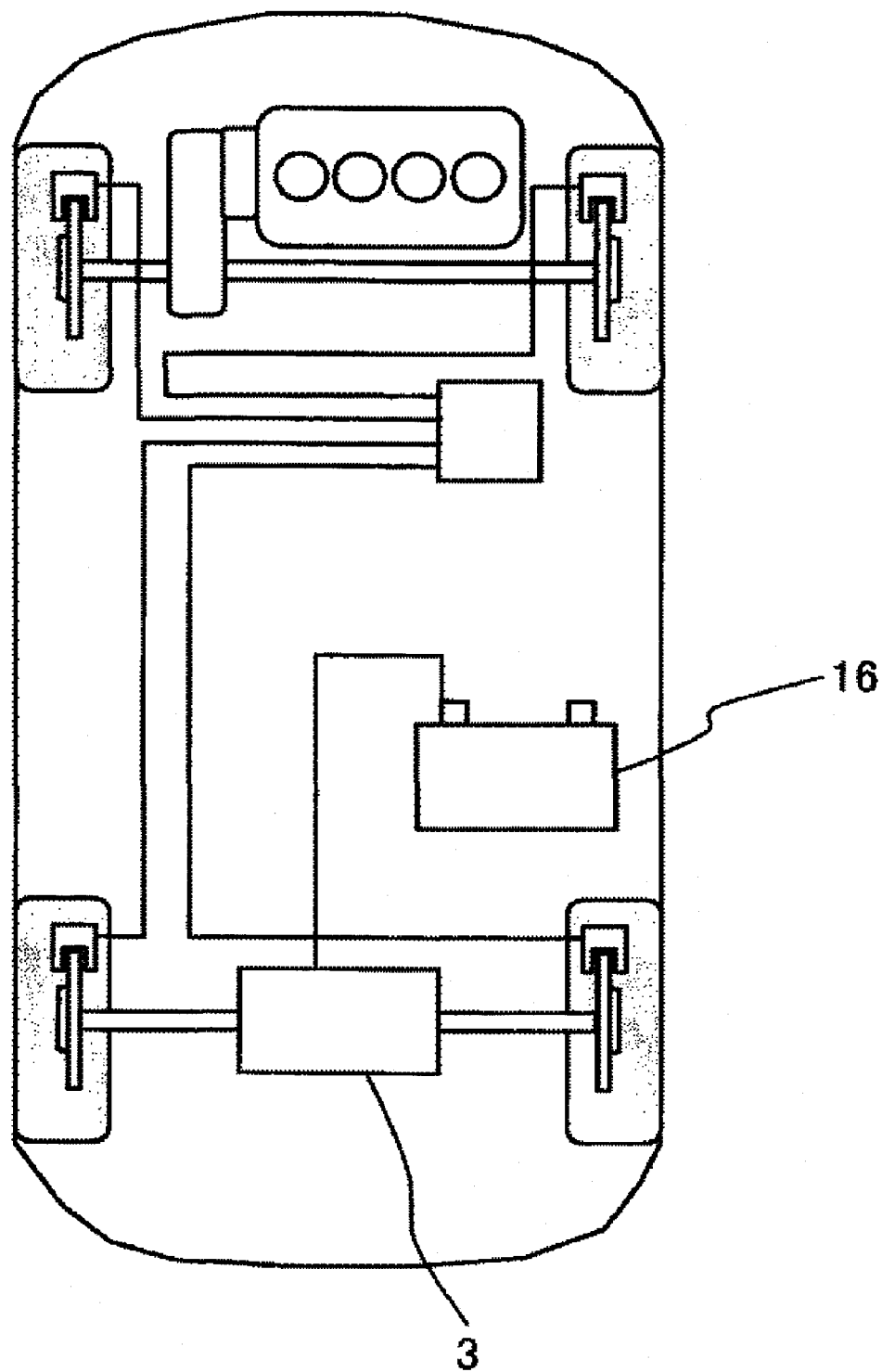
FIG. 21 illustrates the structure adopted in the vehicle dynamics control device achieved in a fourth embodiment of the present invention.

In reference to FIG. 21, the structure adopted in the vehicle dynamics control device achieved in the fourth embodiment of the present invention and the operation executed therein are described.

The structure shown in FIG. 21 includes both a brake actuator and a braking/driving motor actuator functioning as a wheel braking/driving torque actuator 3, and a power storage device 16 that accumulates regenerative braking energy. A brake actuator is installed at each wheel, whereas the braking/driving motor actuator is linked to the rear wheels only. Energy regenerated via the braking/driving motor actuator is supplied to the power storage device 16.

The maximum kinetic energy in the vehicle may be regenerated in the power storage device 16 by applying a brake exclusively via the braking/driving motor actuator without engaging the brake actuators. However, if an excessive level of braking force is generated at the rear wheels, the rear wheels may skid to an excessive extent and the lateral force generated at the rear wheels may become insufficient, which will compromise the stability of the vehicle dynamics. Accordingly, braking/driving torque control is executed as has been described in reference to the first through third embodiment so as to generate a braking torque within the handling assurance limit without inducing a wheel lock. Under these circumstances, a sufficient lateral force is assured at the rear wheels and thus, the kinetic energy generated in the vehicle can be collected in the power storage device 16 without loss of vehicle dynamics stability.

It is to be noted that while brakes are applied via the braking/driving motor actuator for the rear wheels alone in the example described above, a brake may instead be applied via the braking/driving motor actuator and brake actuators used in combination. In addition, while the braking/driving motor actuator is installed at the rear wheels, the present invention may be adopted in conjunction with a braking/driving motor actuator installed at the front wheels. In such a case, an excessive extent of regenerative braking via the front wheels is inhibited to assure a desirable level of vehicle steerability.

According to the vehicle dynamics control device achieved in the above embodiments, automatic acceleration/deceleration control assuring good maneuverability for the driver is enabled even when the road friction coefficient changes, which makes it possible to execute automatic acceleration/deceleration control in a wider range of driving situations and contributes to an improvement in handling under the automatic acceleration/deceleration control.

The above described embodiments are examples, and various modifications can be made without departing from the scope of the invention.

What is claimed is:

1. A vehicle dynamics control device, comprising:
   a control unit that is configured to control a braking torque and a driving torque by respectively correcting a deceleration command and an acceleration command, the deceleration and acceleration command being either voluntarily inputted by a driver or automatically inputted by a control device mounted in a vehicle; and
   an upper limit calculation unit that is configured to calculate a slip stiffness as a differential value of a longitudinal force exerted on a tire of a wheel of a vehicle with respect to a wheel slip-ratio, wherein
   the slip stiffness is a rate of change in the longitudinal force exerted on the tire,
   the wheel slip ratio is an extent to which an absolute value of a lateral force exerted on the tire changes relative to an absolute value of a wheel side slip angle,
   the upper limit calculation unit is further configured to set a prescribed value for the slip stiffness, which prescribed value makes an extent of change in the lateral force relative to the wheel side slip angle higher than a prescribed extent of change in the lateral force, and
   the control unit is further configured to control the longitudinal force so that a value for the calculated slip stiffness does not exceed the prescribed value for the slip stiffness.

2. A vehicle dynamics control device comprising:
   a control unit that is configured to control a braking torque and a driving torque by respectively correcting a deceleration command and an acceleration command, the deceleration and acceleration command being either voluntarily inputted by a driver or automatically inputted by a control device mounted in a vehicle;

an upper limit calculation unit that is configured to calculate a body slip stiffness (VSstf) in accordance with the following mathematical formula:

$$VSstf = \frac{M \cdot |G_{xact}| \cdot \{1 - kw \cdot (H/L_{wheelbase}) \cdot (Sw[FL] + Sw[FR] - Sw[RL] - Sw[RR])\}}{(Sw[FL] + Sw[FR] + Sw[RL] + Sw[RR])}$$

wherein

VSstf is a differential value of a longitudinal force exerted on a tire of a wheel of the vehicle with respect to a wheel slip ratio, the wheel slip ratio is an extent to which an absolute value of a lateral force exerted on the tire changes relative to an absolute value of a wheel side slip angle, a longitudinal acceleration of the vehicle is Gxact, a vehicle mass is M, a load dependency coefficient of the longitudinal force exerted on the tire of the wheel of the vehicle is kw, a vehicle gravitational center height is H, a vehicle wheelbase is Lwheelbase, a wheel slip ratio of a front left wheel is SW[FL], a wheel slip ratio of a front right wheel is SW[FR], a wheel slip ratio of a rear left wheel is SW [RL], and wheel a slip ratio of a rear right wheel is SW [RR], each wheel slip ratio is calculated based on a vehicle body velocity and each wheel velocity, the upper limit calculation unit is further configured to set a prescribed value for the body slip stiffness, which prescribed value makes an extent of change in the lateral force relative to the wheel side slip angle higher than a prescribed extent of change in the lateral force, and the control unit is further configured to control the longitudinal force so that a value for the calculated body slip stiffness does not exceed the prescribed value for the body slip stiffness.

3. A vehicle dynamics control device, comprising:

a control unit that is configured to control a braking torque and a driving torque by respectively correcting a deceleration command and an acceleration command, the deceleration and acceleration command being either voluntarily inputted by a driver or automatically inputted by a control device mounted in a vehicle; and an upper limit calculation unit that is configured to set a prescribed value for slip stiffness, which prescribed value makes an extent of change in a lateral force exerted on a tire relative to a wheel side slip angle higher than a prescribed extent of change in the lateral force, wherein the upper limit calculation unit sets a value for the slip stiffness that corresponds to a value of: i) the prescribed value for the slip stiffness, when a wheel slip ratio calculated based on a body velocity V and a wheel velocity is Vw is 0, and ii) a slope of a straight line connecting an origin point and a point at which a longitudinal force absolute value intersects with the wheel slip ratio, in a graph of the longitudinal force absolute value versus wheel slip ratio, when the wheel slip ratio assumes positive values, the control unit is further configured to control a longitudinal force exerted on the tire so that a calculated value for the slip stiffness does not exceed the prescribed value for the slip stiffness, the slip stiffness is a rate of change in the longitudinal force, and the wheel slip ratio is an extent to which an absolute value of the lateral force changes relative to an absolute value of the wheel side slip angle.

* * * * *